(12) United States Patent
Ryan

(10) Patent No.: US 7,197,165 B2
(45) Date of Patent: Mar. 27, 2007

(54) EYE TRACKING USING IMAGE DATA

(75) Inventor: Mathew David Ryan, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 10/358,067

(22) Filed: Feb. 4, 2003

(65) Prior Publication Data

US 2003/0146901 A1 Aug. 7, 2003

(30) Foreign Application Priority Data

Feb. 4, 2002 (GB) .................... 0202520.3
Dec. 16, 2002 (GB) .................... 0229264.7

(51) Int. Cl.
*G06K 9/00* (2006.01)
(52) U.S. Cl. ..................... 382/103
(58) Field of Classification Search ................ 382/103
See application file for complete search history.

(56) References Cited

U.S. PATENT DOCUMENTS

| | | | |
|---|---|---|---|
| 3,069,654 A | 12/1962 | Hough | 340/146.3 |
| 4,836,670 A | 6/1989 | Hutchinson | 351/210 |
| 5,231,674 A | 7/1993 | Cleveland et al. | 382/6 |
| 5,345,281 A | 9/1994 | Taboada et al. | 351/210 |
| 5,644,642 A | 7/1997 | Kirschbaum | 382/103 |
| 5,726,916 A | 3/1998 | Smyth | 364/559 |
| 5,774,591 A * | 6/1998 | Black et al. | 382/236 |
| 5,861,940 A | 1/1999 | Robinson et al. | 351/221 |
| 5,982,912 A | 11/1999 | Fukui et al. | 382/118 |

(Continued)

FOREIGN PATENT DOCUMENTS

EP 1 211 640 A2 6/2002

(Continued)

OTHER PUBLICATIONS

Heinzmann et al, "3-D facial pose and gaze point estimation using a robust real-time tracking paradigm", Automatic Face and Gesture Recognition, 1998. Proceedings. Third IEEE International Conference on Apr. 14-16, 1998, pp. 142-147. See whole document.*

(Continued)

*Primary Examiner*—Jingge Wu
*Assistant Examiner*—Tom Y. Lu
(74) *Attorney, Agent, or Firm*—Fitzpatrick, Cella, Harper & Scinto

(57) ABSTRACT

In a computer processing apparatus 8, frames of image data received from a camera 4 are processed to track the eyes of a user 2 in each image. A 3D computer model of a head is stored, and search regions are defined in the 3D space corresponding to the eyes and eyebrows. For each image, pixels within the projection of the search regions from the 3D space to the 2D image space are sampled to determine a representative intensity value for each of the search regions. Positions for the eyes in the 3D space are then calculated based on the determined values. The 3D computer model and search bands are moved within the 3D space to align the eyes with the calculated eye positions. In this way, when the next image is processed, the search bands project into the image from a head configuration determined from the previous image. This facilitates reliable and accurate eye tracking.

61 Claims, 29 Drawing Sheets

U.S. PATENT DOCUMENTS

| | | | |
|---|---|---|---|
| 6,090,051 A | 7/2000 | Marshall | 600/558 |
| 6,091,378 A | 7/2000 | Richardson et al. | 345/7 |
| 6,154,559 A | 11/2000 | Beardsley | 382/103 |
| 6,246,779 B1 | 6/2001 | Fukui et al. | 382/103 |
| 7,043,056 B2 * | 5/2006 | Edwards et al. | 382/103 |

FOREIGN PATENT DOCUMENTS

| | | |
|---|---|---|
| WO | WO 00/26713 | 5/2000 |
| WO | WO 02/09025 | 1/2002 |
| WO | WO 02/089064 | 11/2002 |

OTHER PUBLICATIONS

Soo-Chang et al, "Global motion estimation in model-based image coding by tracking three-dimensional contour feature points", Circuits and Systems for Video Technology, IEEE transactions on vol. 8, Issue 2, Apr. 1998 pp. 181-190. See whole document.*

"An Eye Tracking Computer User Interface," A. Kaufman, et al., Researchers Frontiers in Virtual Reality Workshop Proceedings, IEEE Computer Society Press, pp. 120-121, Oct. 1993.

"Euclidean Reconstruction from Uncalibrated Views," R. Hartley, Applications of Invariance in Computer Vision, Mundy, Zisserman and Forsyth eds, pp. 237-255, Azores, 1993.

"A Real-Time Face Tracker," J. Yang, et al., Third IEEE Workshop on Applications of Computer Vision, pp. 142-147, Sarasota, Florida, 1996.

"Finding Skin in Color Images," R. Kjeldson, et al., Proceedings of the 2nd International Conference on Automatic Face and Gesture Recognition (FG '96), pp. 312-317, 1996.

"Coordination of Perceptual Processes for Computer Mediated Communication," J. Coutaz, Proceedings of INTERACT '97, In Proceedings of 2nd International Conference on Automatic Face and Gesture Recognition, Killington, Vermont, 1996.

"Tracking Eyes and Monitoring Eye Gaze," by R. Steifelhagen, et al., Proceedings of the Workshop on Perceptual User Interfaces (PUI '97), pp. 98-100, Alberta, Canada, 1997.

"Eigen-Space Coding as a Means to Support Privacy in Computer Mediated Communication," J. Coutaz, et al., In Proceedings of INTERACT '97, Chapman & Hall Pubs., 1997.

"Computer Vision Face Tracking for Use in Perceptual User Interface." G. Bradski, Intel Technology Journal Q2 1998, pp. 1-15.

"Manual and gaze input cascade (MAGIC) pointing," S. Zhai, et al., Proceedings of the CHI 99 Conference on Human factors in computing systems, Pittsburgh, Pennsylvania, 1999.

"An Algorithm for Real-Time Stereo Vision Implementation of Head Pose and Gaze Direction Measurement," Y. Matsumoto, et al., Proceedings of the Fourth IEEE International Conference on Automatic Face and Gesture Recognition, 2000.

* cited by examiner

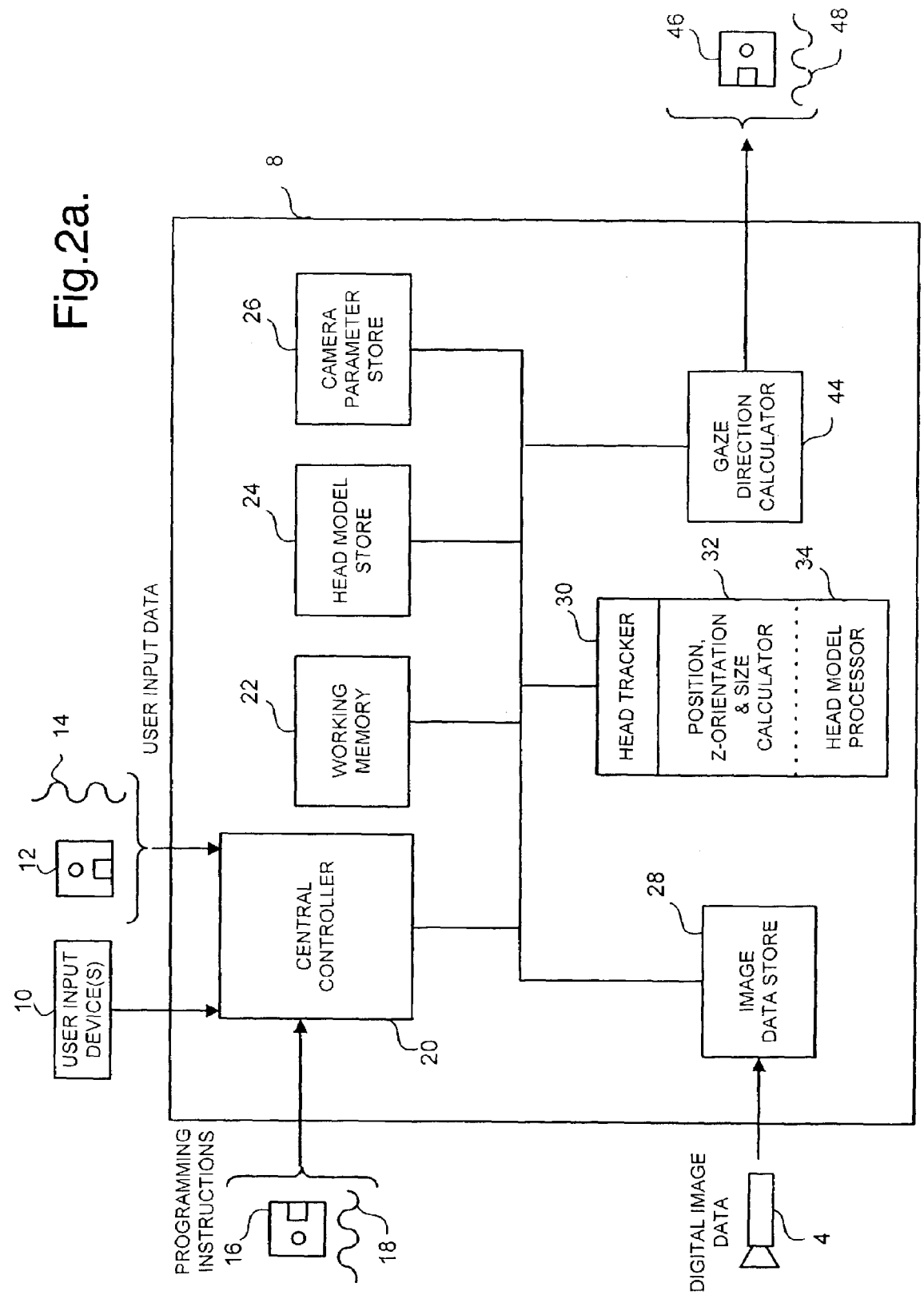

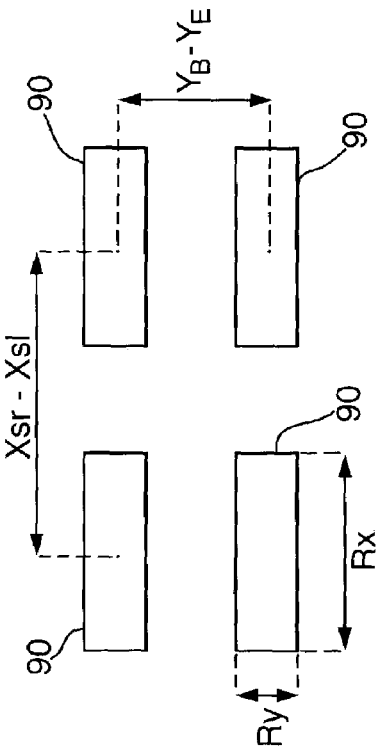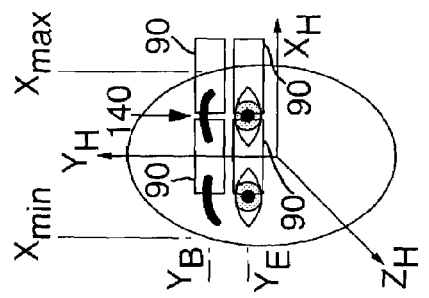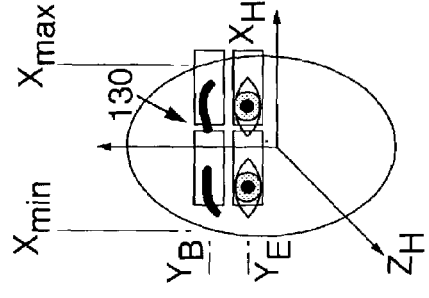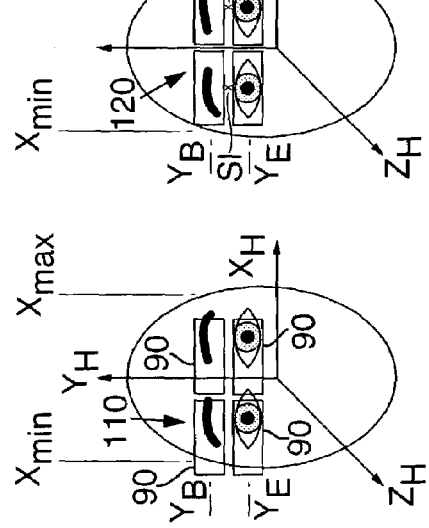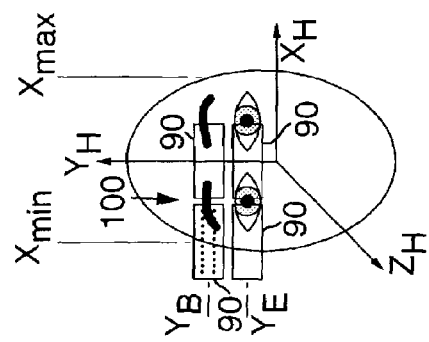

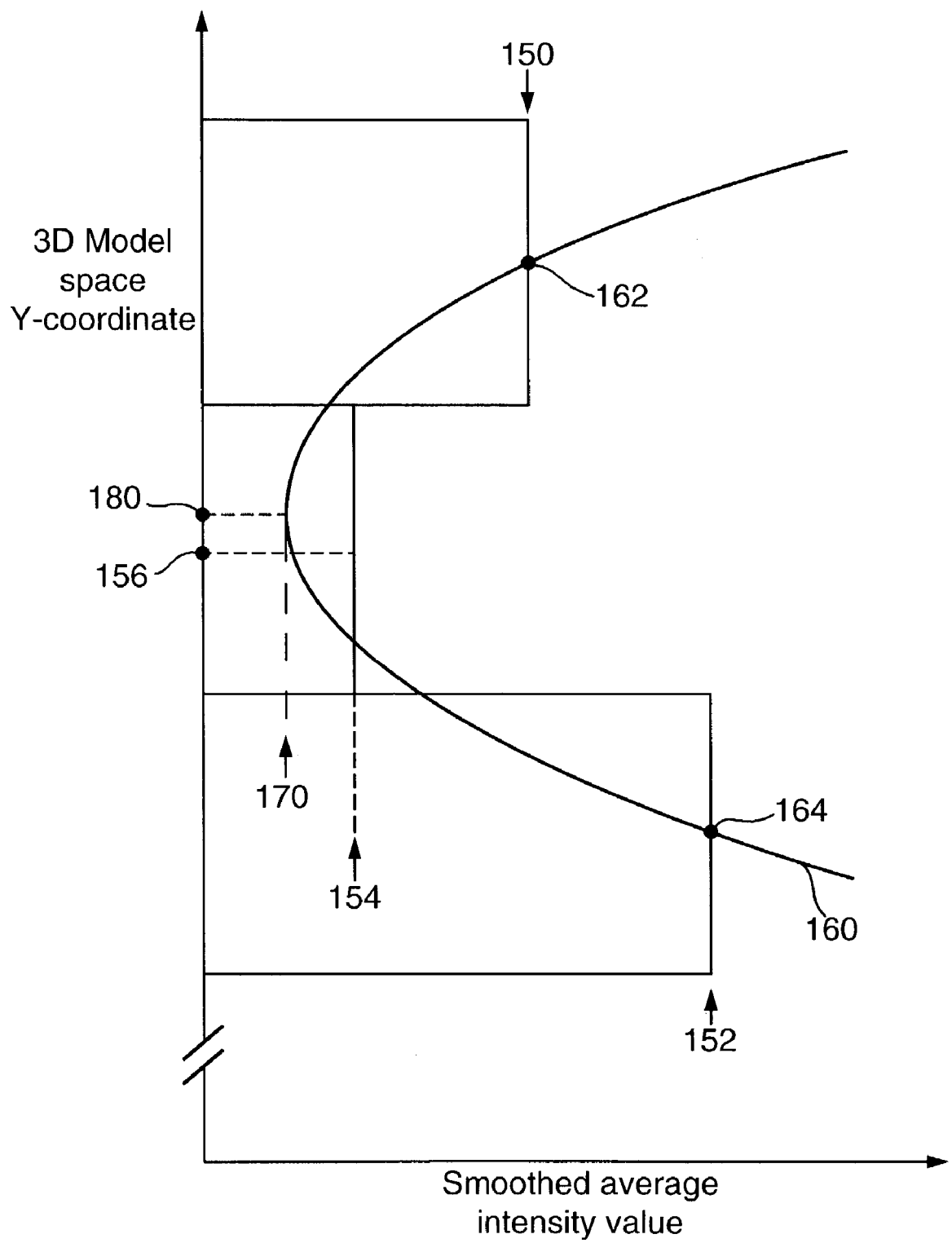

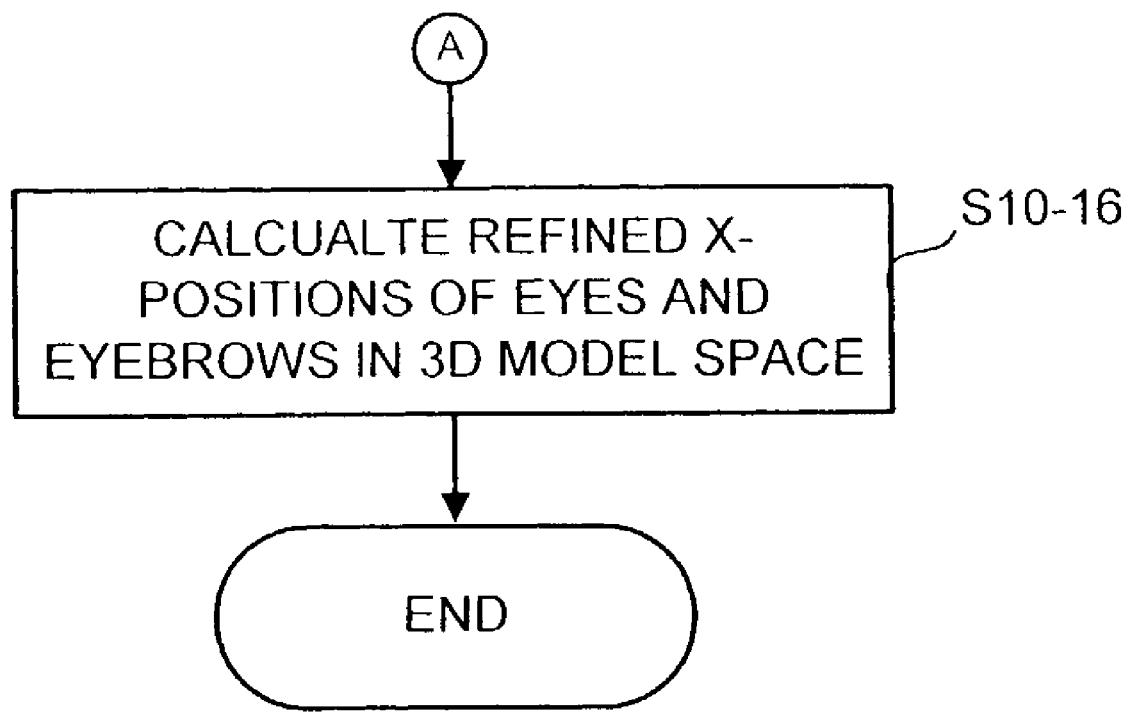

3D Head Coordinate System, H

3D Head Coordinate System, H

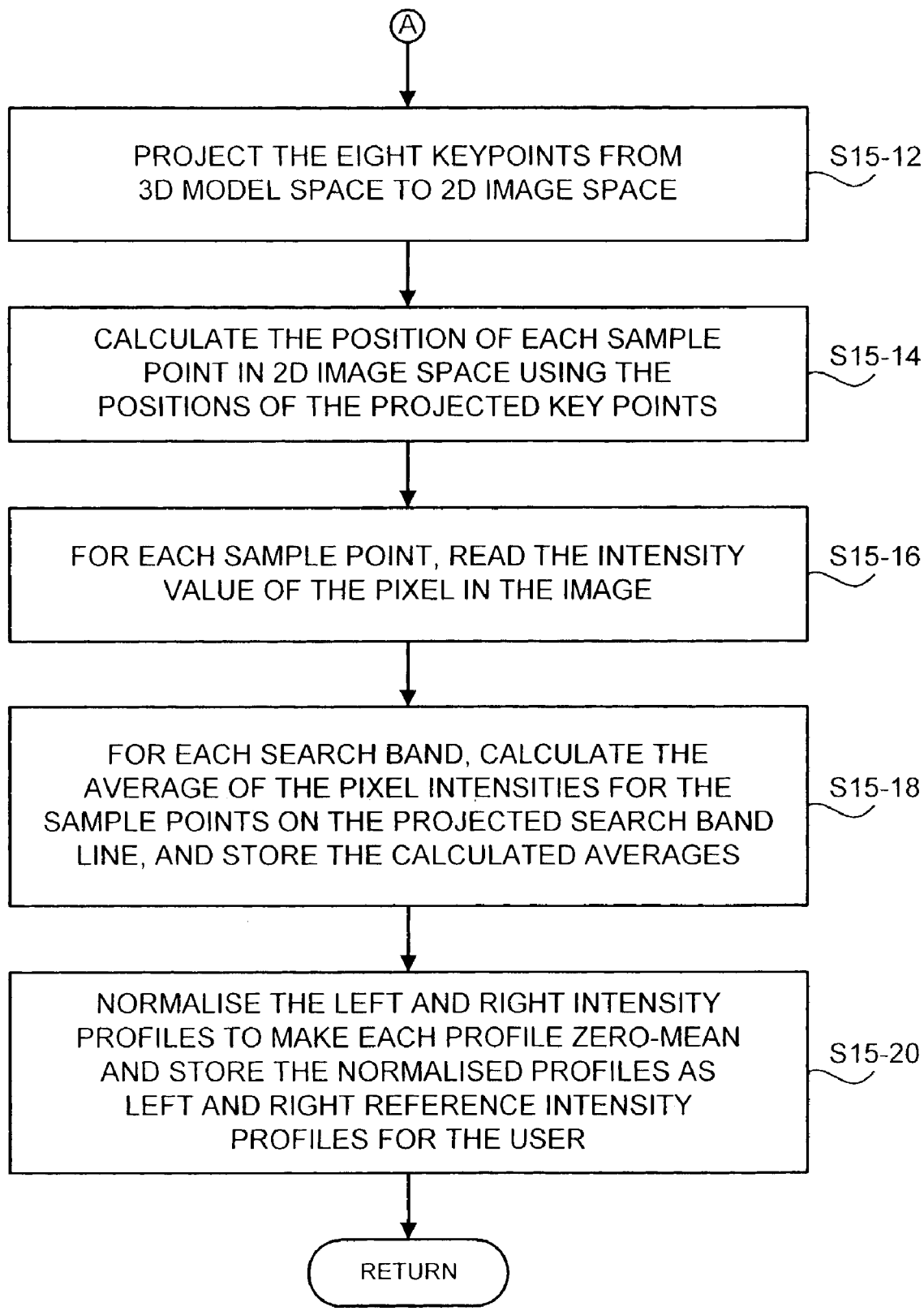

3D Head Coordinate System, H

2D Image Coordinate System, I

2D Image Coordinate System, I

2D Image Coordinate System, I

3D Head Coordinate System, H

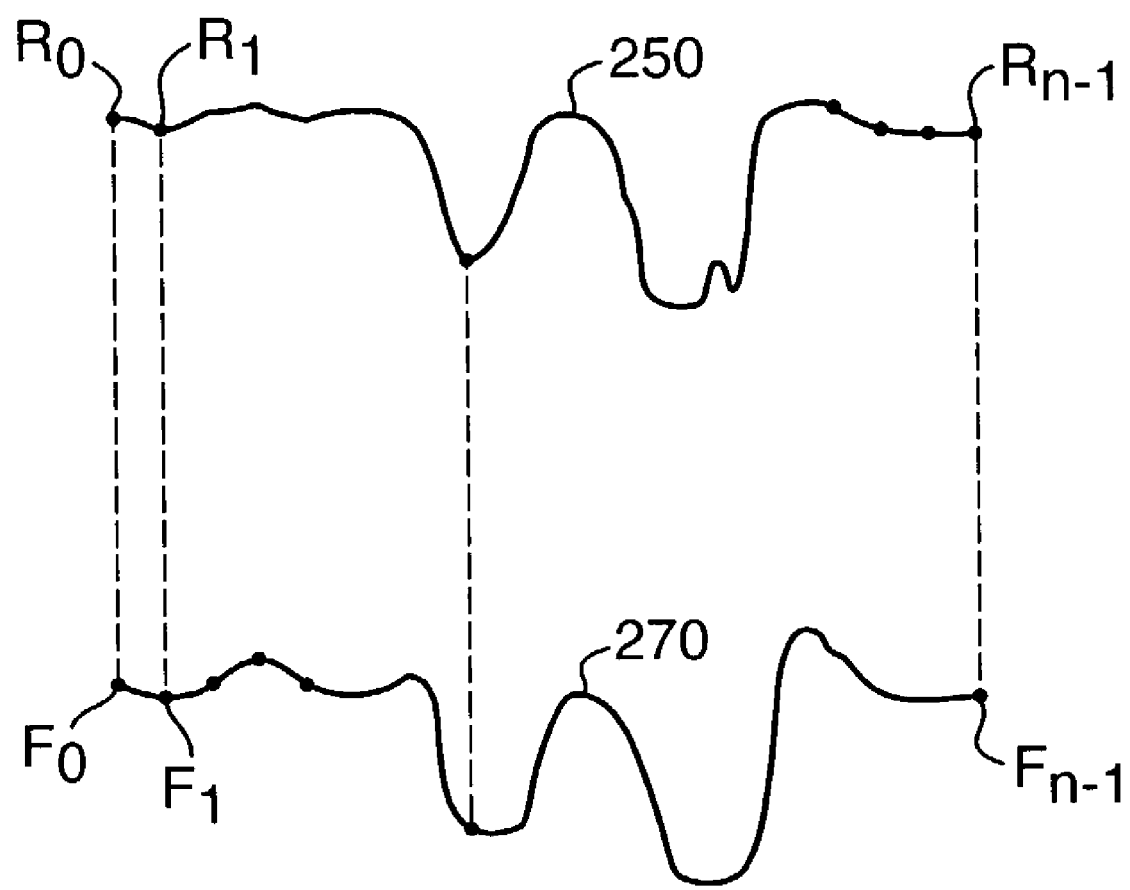

EYE TRACKING USING IMAGE DATA

The present invention relates to the field of eye tracking.

Tracking the eyes of a real-life person is important for many applications. In particular, it allows the person's gaze direction (and therefore what the person is looking at) to be determined.

The present invention is concerned with the processing of images showing the face of a user as the user moves his head, to track the movement of the user's eyes in an accurate and reliable manner.

According to the present invention, eye tracking is carried out using a stored three-dimensional (3D) computer model of at least the eyes and eyebrows of a head in a three-dimensional space. Search regions are defined in the three-dimensional space corresponding to the eyes and eyebrows. For each image in a sequence of images of a user's head, pixels within the projection of the predefined search regions from the three-dimensional space to the two-dimensional image are sampled to determine pixel image values (intensity, or one or more colour component values, or hue, etc) for each search region. Positions for the eyes in the three-dimensional space are then calculated in dependence upon the determined pixel image values. The 3D computer model and search bands are then moved within the three-dimensional space to align the eyes with the calculated eye positions. In this way, when the next image in the sequence is processed, the search bands project into the image from a head configuration in three-dimensional space determined from the previous image. This facilitates reliable and accurate eye tracking for all of the images in the sequence.

In one embodiment, each search region is a two-dimensional area in the three-dimensional space, and positions for the eyes in the three-dimensional space are calculated on the basis that eyes and eyebrows are recorded as dark bands in the images relative to the other parts of the face, and the dark band caused by an eye will be below the dark band caused by an eyebrow.

In another embodiment, each search region is a line in the three-dimensional space, and positions for the eyes in the three-dimensional space are calculated by comparing the pixel image values for the search regions with prestored reference image values.

The present invention provides apparatus and methods for use in performing the processing, and computer program products for enabling a programmable apparatus to become operable to perform the processing.

Embodiments of the invention will now be described, by way of example only, with reference to the accompanying drawings, in which like reference numbers are used to designate like parts, and in which:

FIG. 1 illustrates the recording of images of a user as the user changes the position and orientation of his head, the image data subsequently being processed to track the user's eyes;

FIGS. 2a and 2b schematically show the components of a first embodiment of the invention, together with the notional functional processing units into which the processing apparatus component may be thought of as being configured when programmed by programming instructions;

FIGS. 3a and 3b show the processing operations performed by the processing apparatus in FIG. 2 to process input data;

FIG. 4 schematically illustrates the transformation defined at step S3-2 in FIG. 3;

FIGS. 6a to 6f illustrate the search regions and sample points defined at step S3-4 in FIG. 3 for use in determining the x-axis positions of the user's eyes and eyebrows;

FIG. 9 illustrates the processing to calculate a refined y-position at step S8-22 in FIG. 8;

FIGS. 10a and 10b show the processing operations performed at step S7-4 in FIG. 7;

Figure 4:
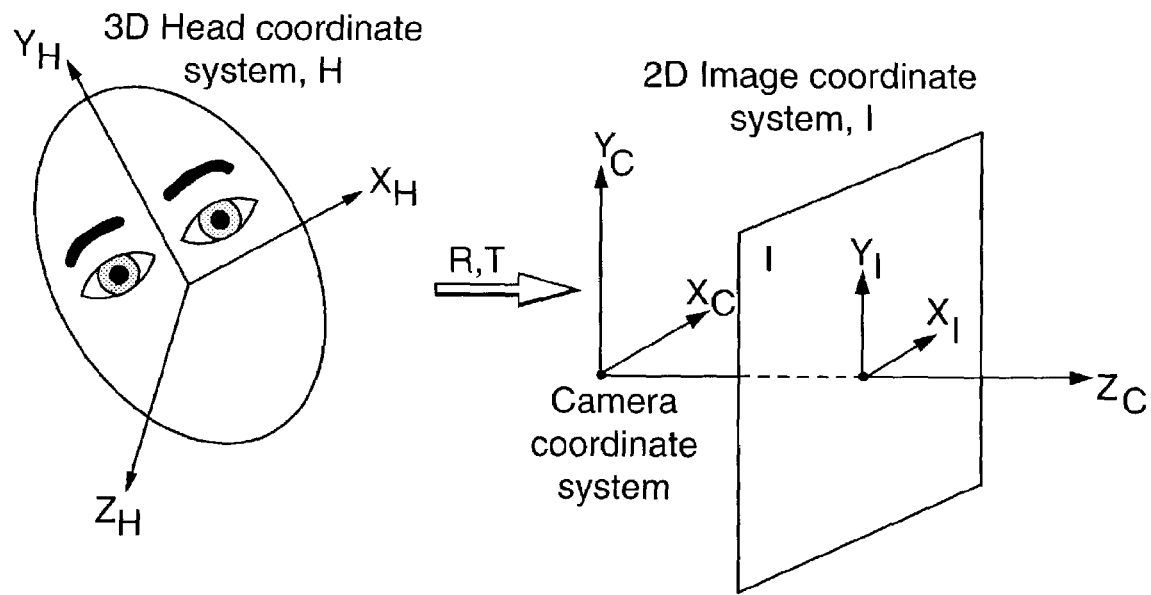
Figure 12:
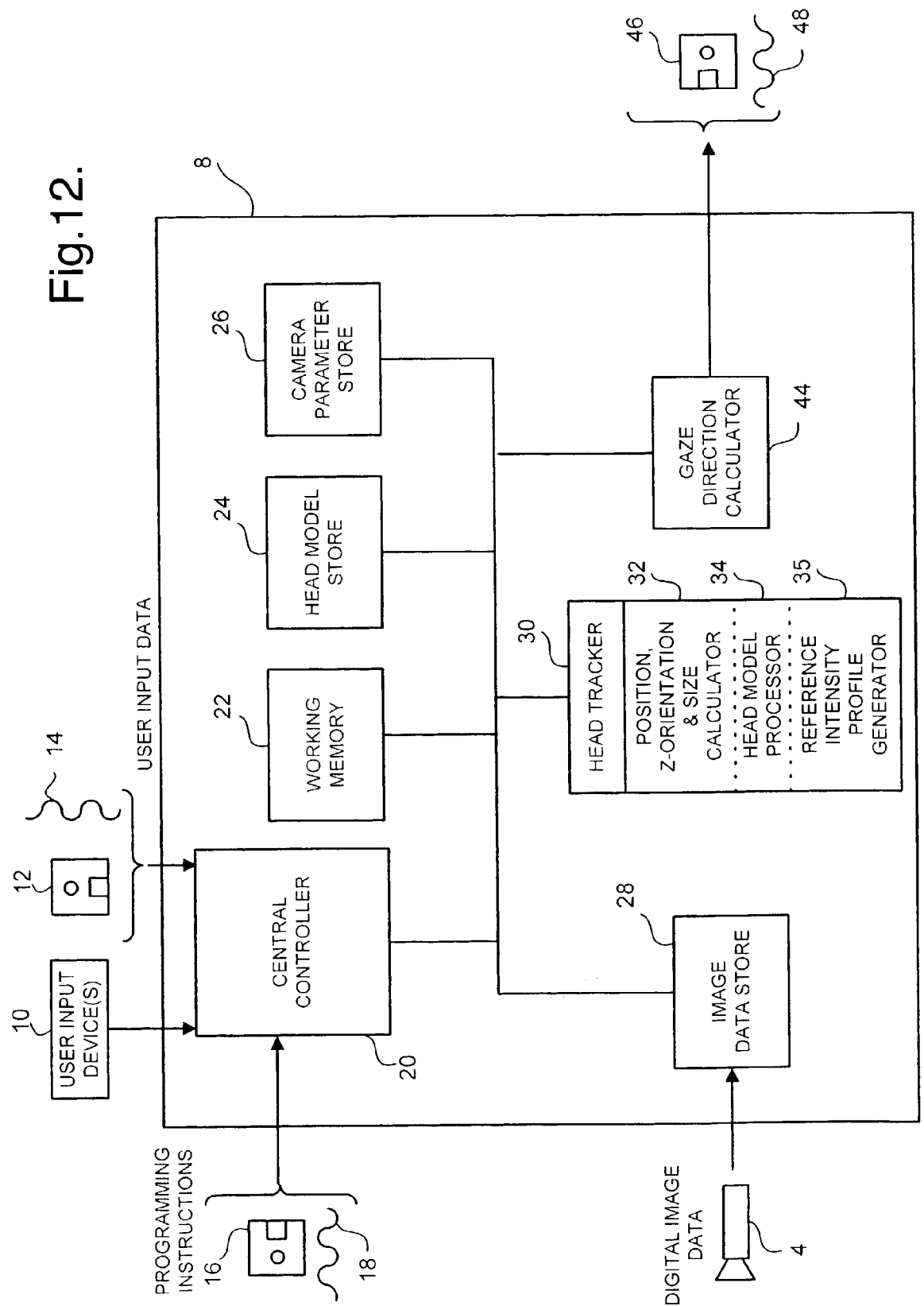
Figure 13A:
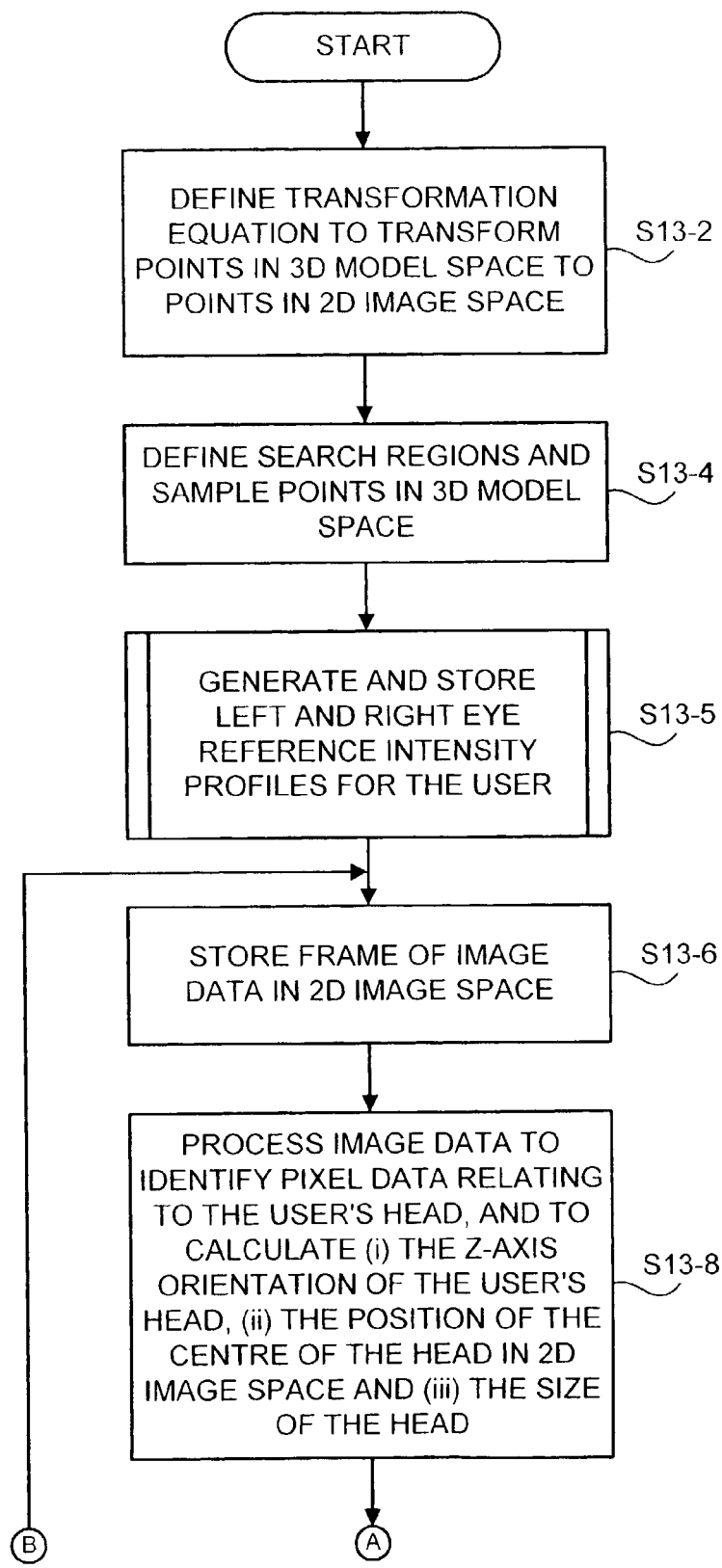
Figure 13B:
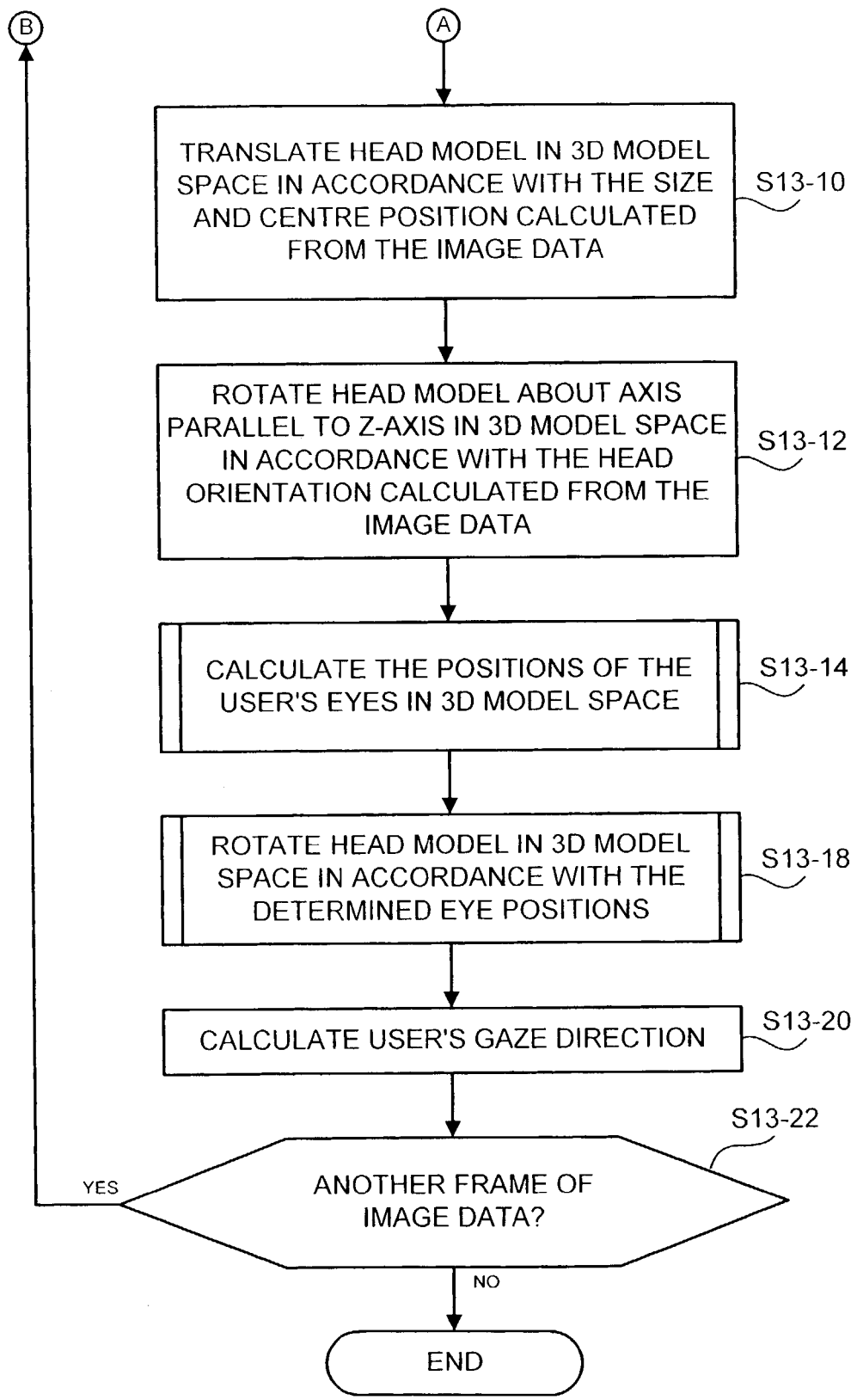
Figure 14A:
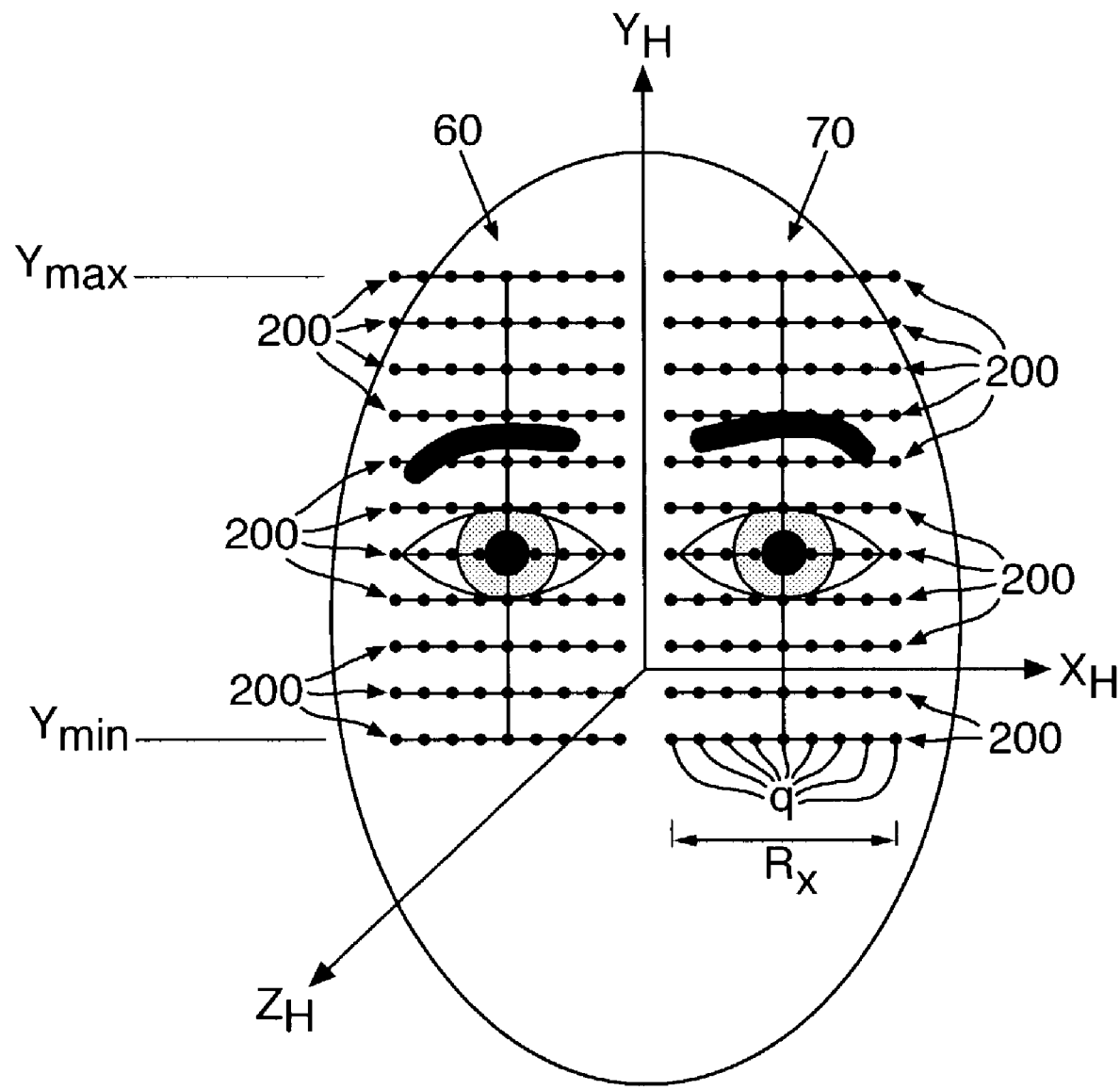
Figure 14B:
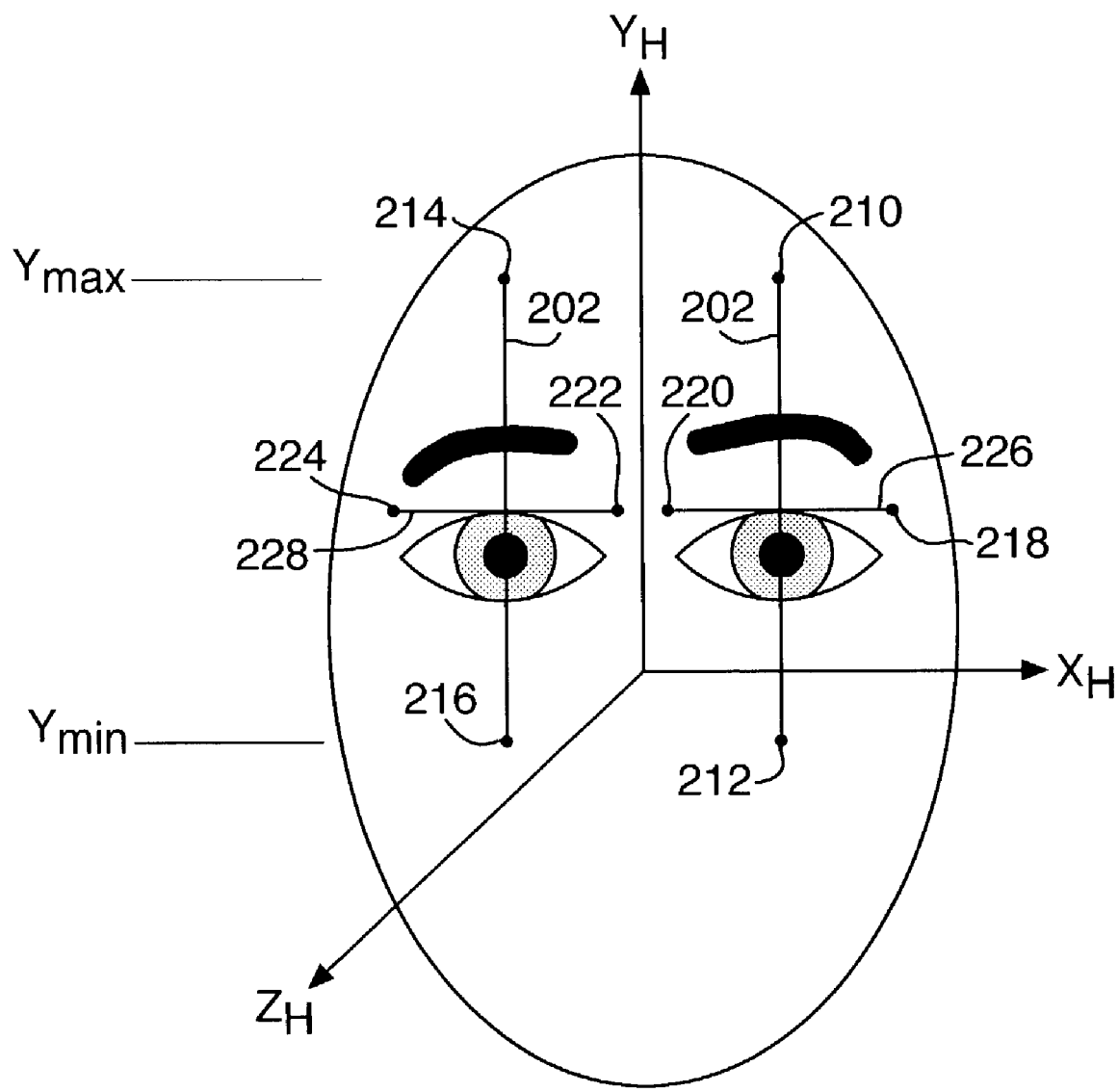
Figure 15A:
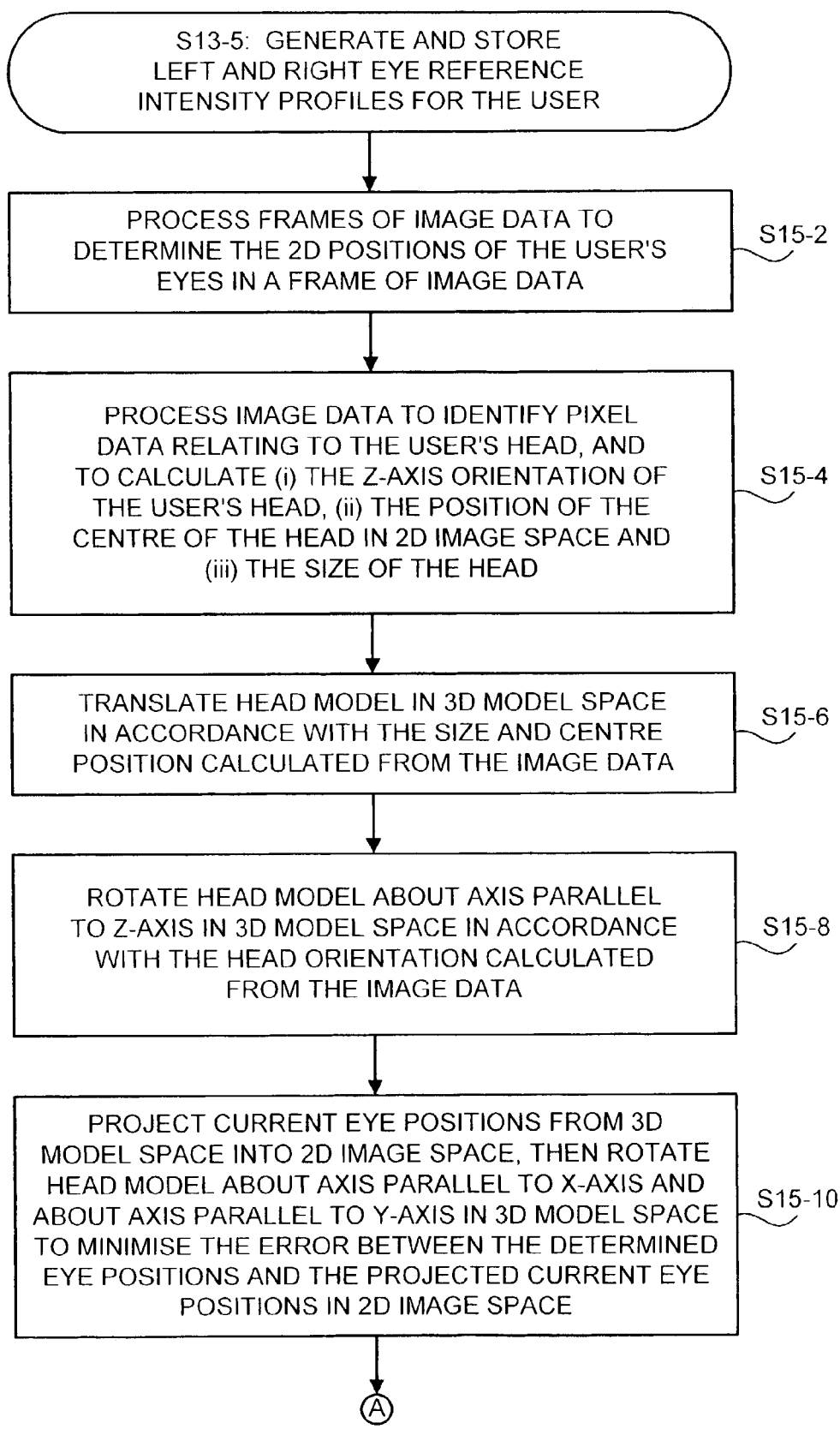
Figure 17:
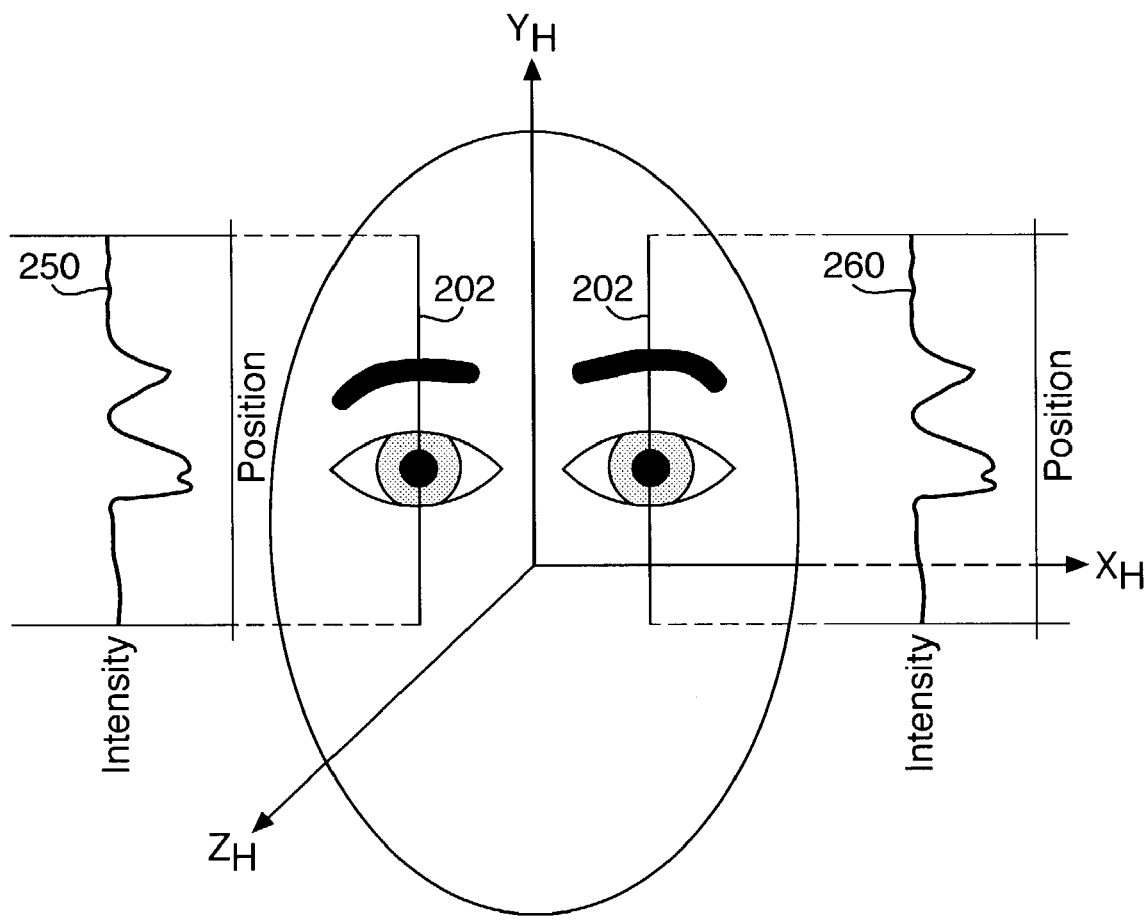
Figure 18:
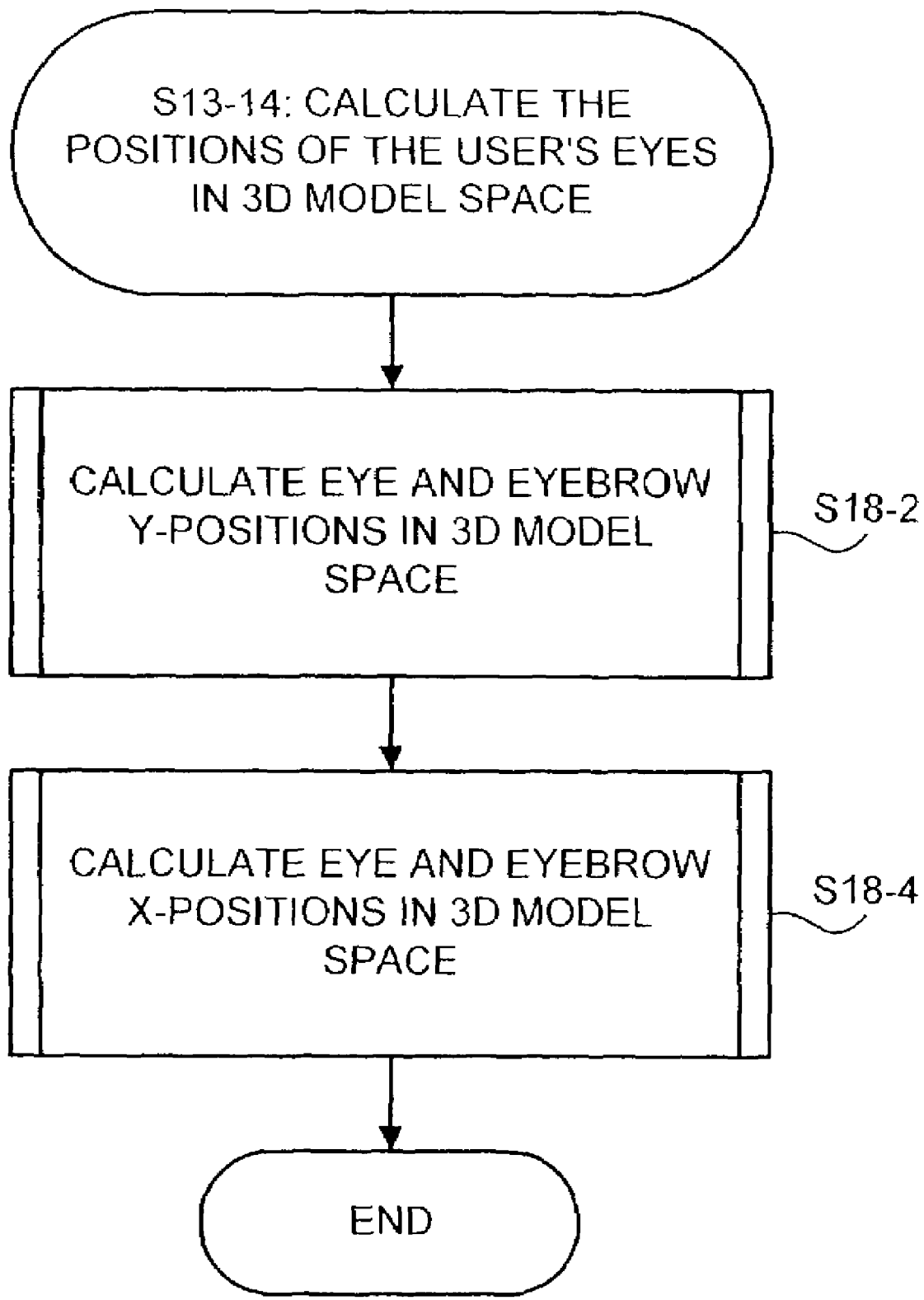
Figure 19A:
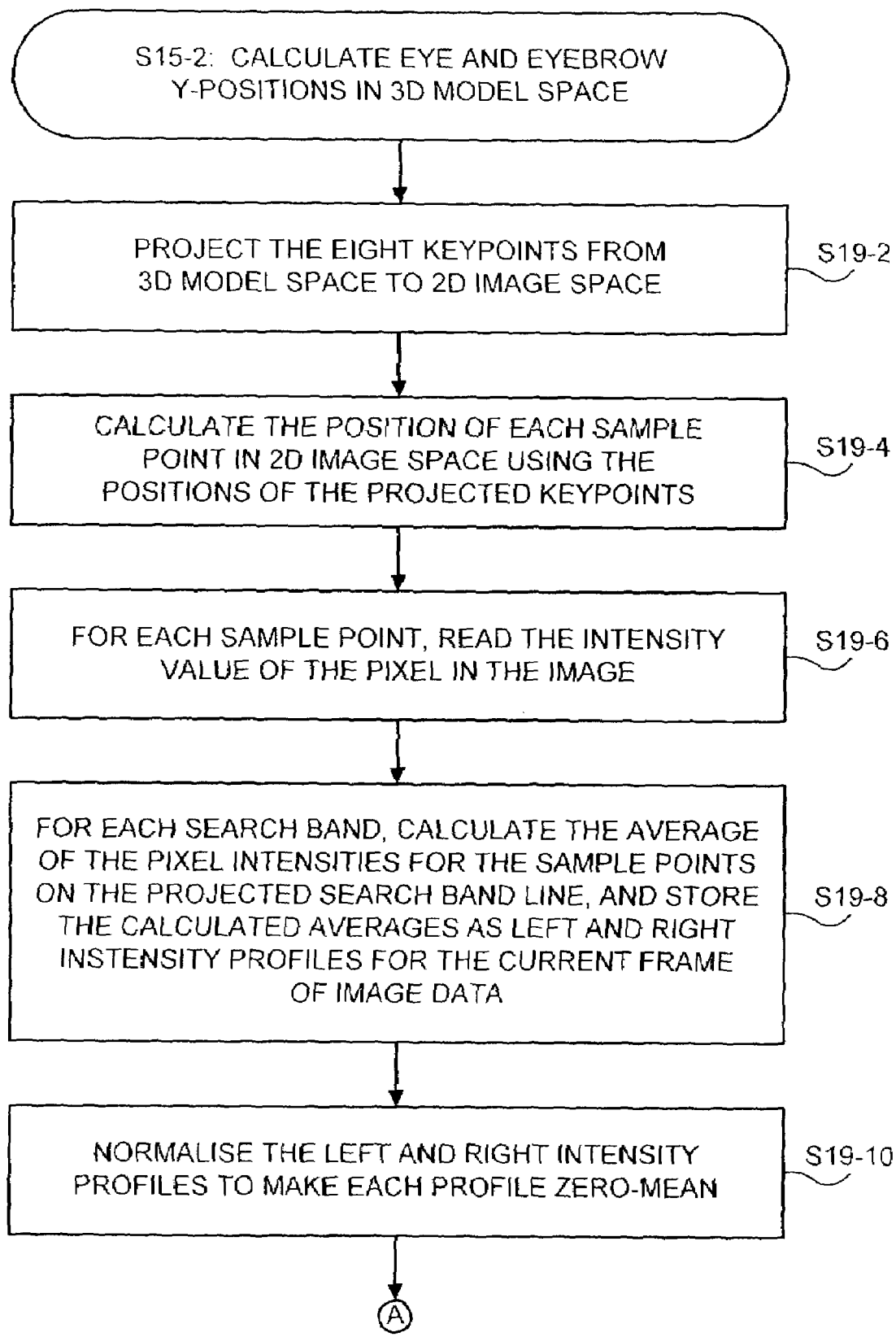
Figure 19B:
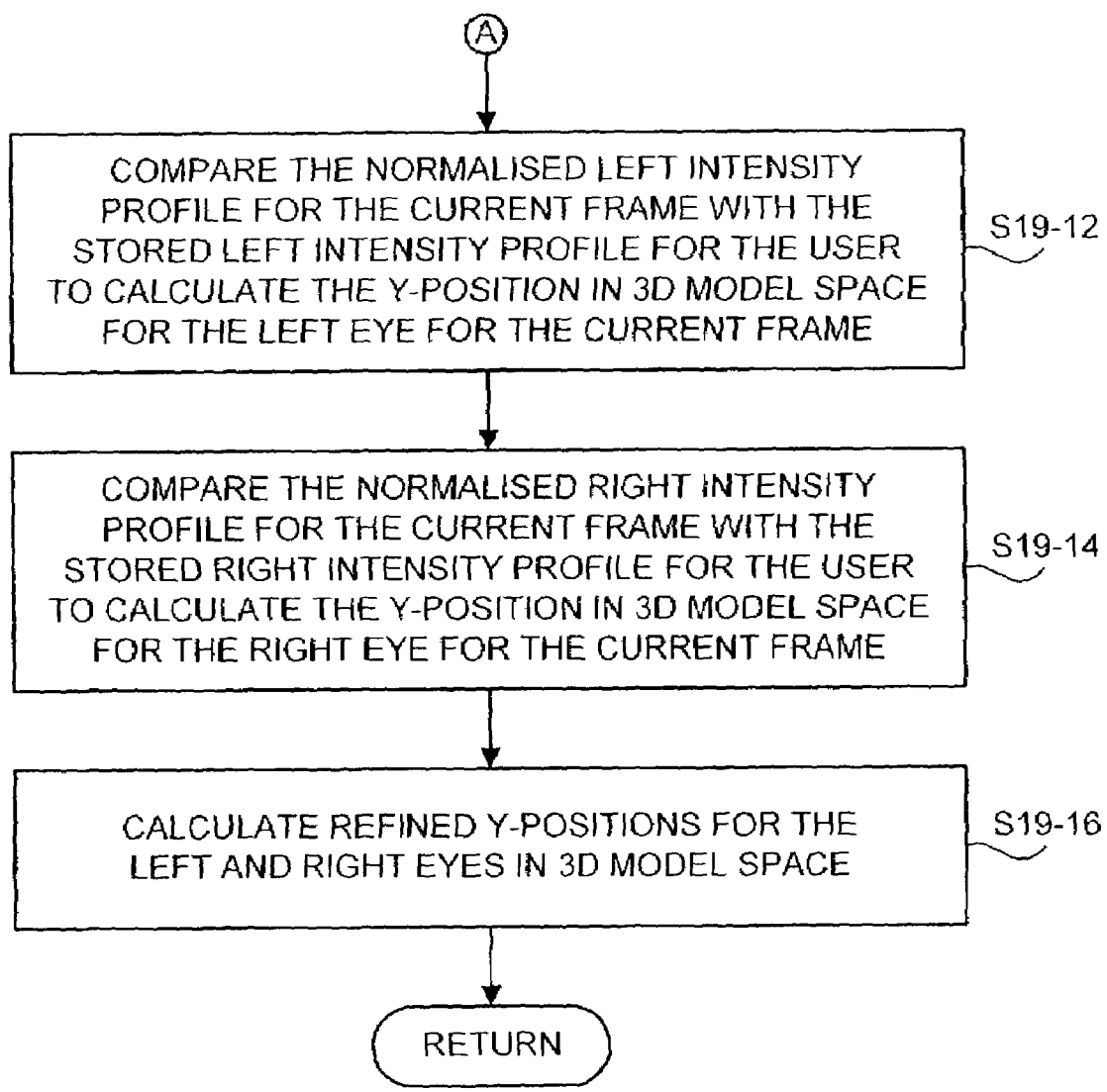

FIG. 12 schematically shows the components of a second embodiment of the invention, together with the notional functional processing units into which the processing apparatus component may be thought of as being configured when programmed by programming instructions;

FIGS. 13a and 13b show the processing operations performed by the processing apparatus in FIG. 12;

FIGS. 14a and 14b illustrate the search bands and sample points defined at step S13-4 in FIG. 4 for use in determining the Y-axis positions of the user's eyes;

FIGS. 15a and 15b show the processing operations performed at step S13-5 in FIG. 13;

FIGS. 16a to 16d illustrate the projection of keypoints and the calculation of sample points at steps S15-12 and S15-14 of FIG. 15;

FIG. 17 illustrates the reference intensity profiles generated by the processing at step S15-18 of FIG. 15;

FIG. 18 shows the processing operations performed at step S13-14 in FIG. 13;

FIGS. 19a and 19b show the processing operations performed at step S15-2 in FIG. 15; and FIGS. 20a to 20e show examples to illustrate the processing performed in step S19-12 in FIG. 19.

FIRST EMBODIMENT

Figure 1:
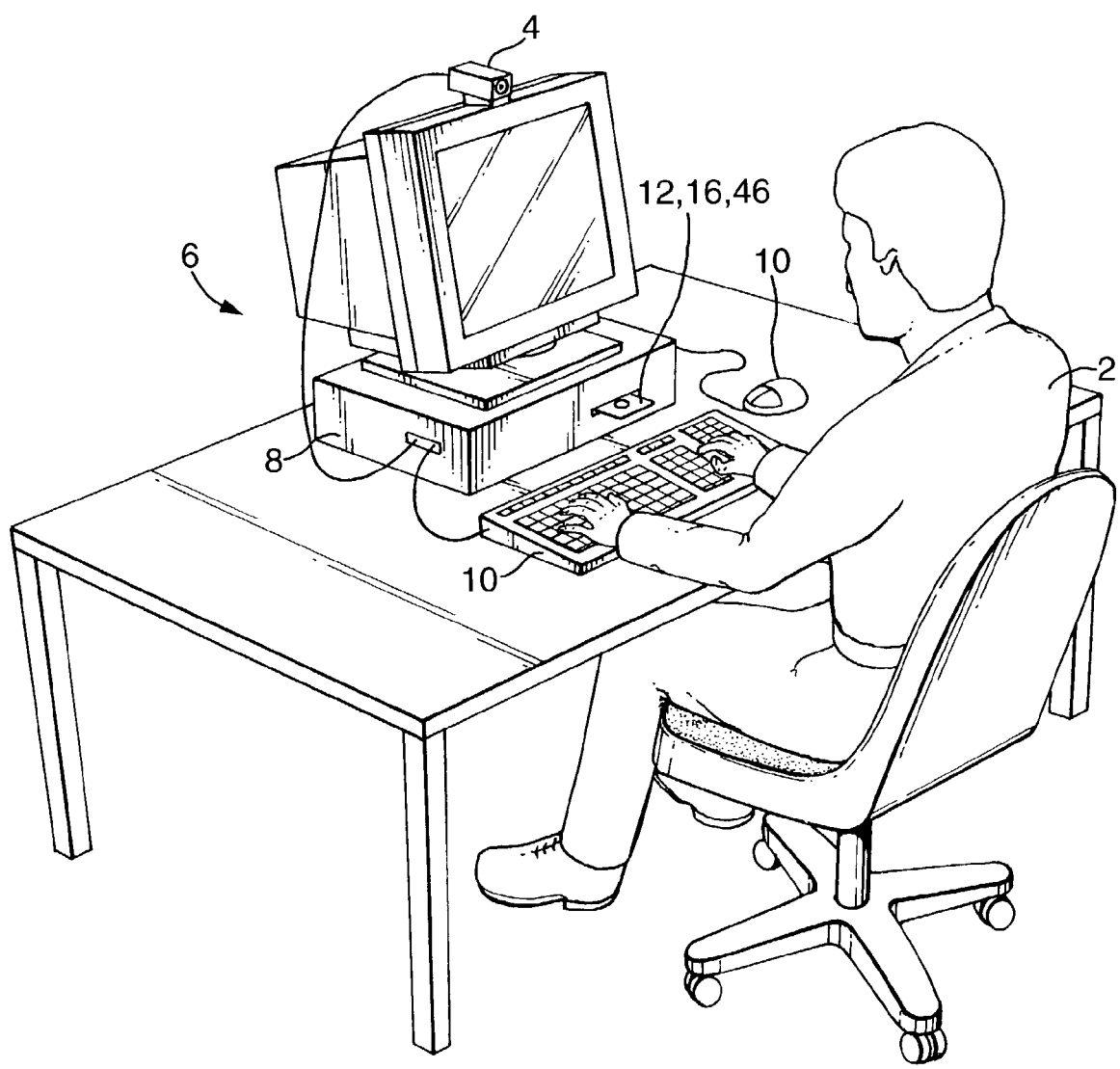

Referring to FIG. 1, in an embodiment of the invention, images of a user 2 are recorded by a single video camera 4, of conventional design, as the user 2 changes the position and orientation of his head, which, in this embodiment, occurs as the user operates a personal computer 6.

The digital image data recorded by camera 4 is input to the processing apparatus component 8 of the personal computer 6, which processes the data to track the eyes of the user 2 in a way which will be described below.

The processing apparatus component 8 of the personal computer 6 contains, in a conventional manner, one or more processors, memories, graphics cards, etc.

Figure 2B:
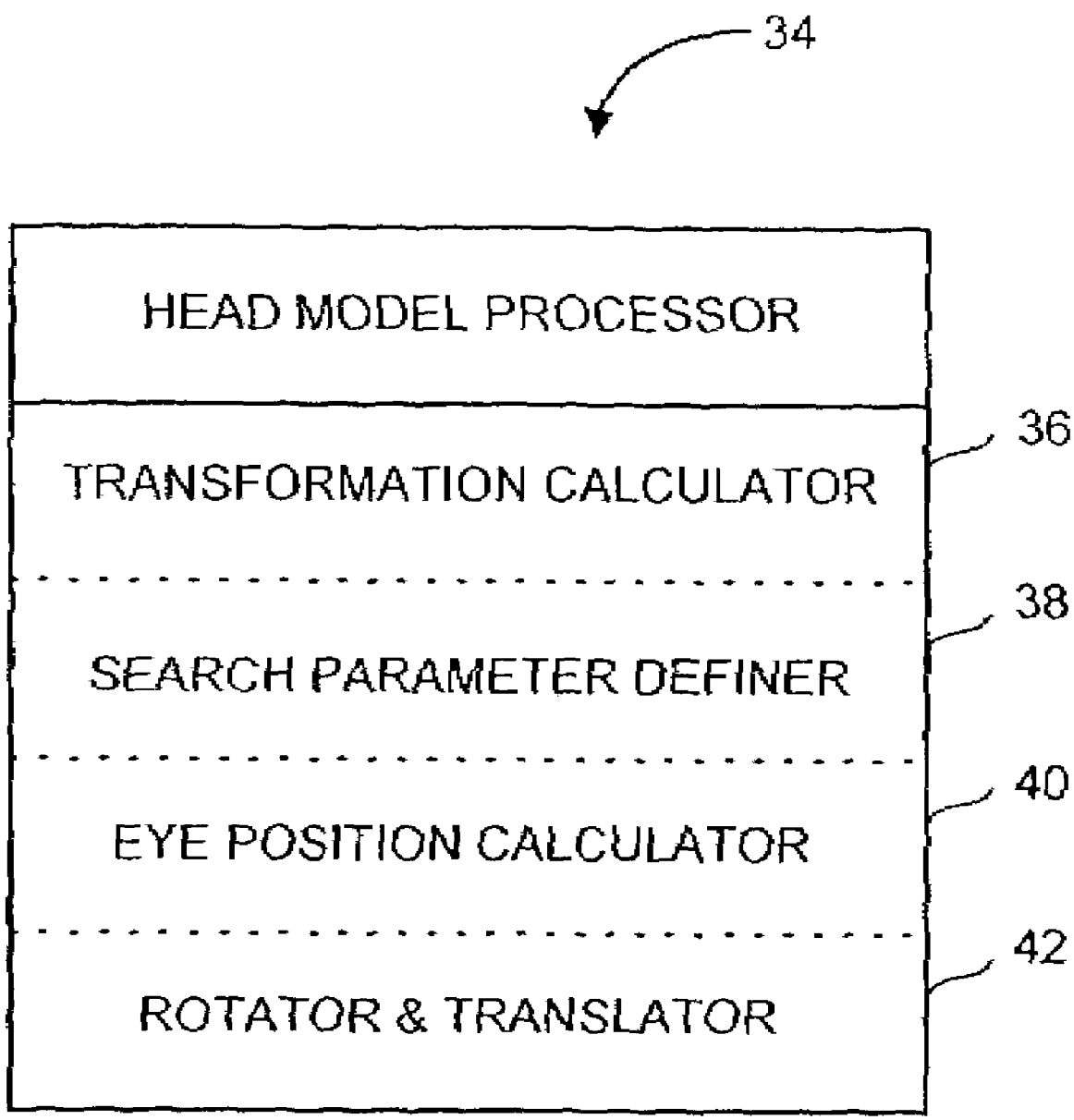

Referring to FIGS. 2a and 2b, the processing apparatus component 8 is programmed to operate in accordance with programming instructions input, for example, as instructions stored on a storage medium, such as disc 16, and/or as a signal 18 input to the processing apparatus 8, for example from a remote database, by transmission over a communication network (not shown) such as the Internet or by transmission through the atmosphere, and/or entered by the user via a user input device 10 such as a keyboard.

As will be described in more detail below, the programming instructions comprise instructions to cause the processing apparatus 8 to become configured to process input data defining a three-dimensional (3D) computer model of the head of the user 2, input data defining parameters of the camera 4, and image data recorded by camera 4 of the user 2, to track the eyes of the user 2 through each frame of image data received from camera 4. More particularly, search regions are defined in the three-dimensional co-ordinate space of the 3D head model to cover the eyes and eyebrows therein, and sample points are defined within each search region. For each frame of image data received from camera 4, each sample point defined in the three-dimensional space of the 3D head model is projected from its current position (resulting from the processing of the previous frame of image data received from camera 4) into the 2D image space, and the value of the corresponding pixel is determined. An average is then calculated for all of the sample pixel values corresponding to the sample points in each search region. This defines a respective average intensity for each search band. Based on the positions of the intensity minima within the search regions, the positions of the user's eyes and eyebrows in the three-dimensional coordinate space of the head model are determined using the principle that the user's eyes and eyebrows will both generate dark bands (minima) in the image and the eye dark bands will always be below the eyebrow dark bands. Based on these positions, the 3D head model and associated search regions are moved in 3D space so that the positions of the eyes in the 3D model correspond to the positions determined from the 2D image recorded by camera 4. This processing is repeated for each frame of image data received from camera 4 to track the user's eyes in an accurate and reliable way.

When programmed by the programming instructions, processing apparatus 8 can be thought of as being configured as a number of functional units for performing processing operations. Examples of such functional units and their interconnections are shown in FIGS. 2a and 2b. The units and interconnections illustrated in FIGS. 2a and 2b are, however, notional, and are shown for illustration purposes only to assist understanding; they do not necessarily represent units and connections into which the processor, memory etc of the processing apparatus 8 actually become configured.

Referring to the functional units shown in FIGS. 2a and 2b, a central controller 20 is arranged to process inputs from the user input devices 10 and to control the storage of data input by the user on a data storage medium, such as disc 12, or as a signal 14. Central controller 20 is also arranged to provide control and processing for the other functional units.

Working memory 22 is provided for use by central controller 20 and the other functional units.

Head model store 24 is configured to store data input to the processing apparatus 8, for example as data stored on storage medium 12 or as a signal 14, defining a 3D computer model of the head of the user 2. The input data defining the 3D computer model of the user's head may be generated, for example, in a conventional manner by a laser scanner, 3D touch sensing probe, etc.

Camera parameter store 26 is configured to store data input to the processing apparatus 8, for example as data stored on a storage medium 12, as a signal 14, or using a user input device 10, defining parameters of the camera 4 which records the image data for processing. More particularly, in this embodiment, camera parameter store 26 is configured to store data defining a scale factor of the camera 4. In this embodiment, the image data for each image recorded by camera 4 is defined in a two-dimensional coordinate system having x and y axes parallel to the x and y axes of the three-dimensional imaging coordinate system of camera 4. The z-axis of the camera coordinate system is defined to lie along the optical axis of the camera 4, so that the origin of the camera coordinate system is at the optical centre of the camera 4. The scale factor stored in camera parameter store 36 is a scalar constant defining how the size of a unit-size object changes in the recorded image as the object moves in the z-axis direction of the camera coordinate system. Consequently, as will be understood by the skilled person, the scale factor will depend upon a number of internal camera parameters and is determined by calibration in a conventional manner.

Image data store 28 is configured to store frames of image data received from camera 4. In this embodiment, image data store 28 has a capacity to store one frame of image data, which is then processed in real-time and discarded before the next frame of image data is received from camera 4.

Head tracker 30 is arranged to process the pixel data defining each image frame stored in image data store 28, to calculate a position for the centre of the 3D computer head model in three-dimensional space and positions for the eyes of the 3D computer head model in three-dimensional space. In addition, head tracker 30 is arranged to translate and rotate the 3D computer head model in three-dimensional space in accordance with the calculated positions. In this way, the position and orientation of the 3D computer head model is updated after the processing of each frame of image data.

In this embodiment, head tracker 30 comprises a position, z-orientation and size calculator 32, and a head model processor 34.

Position, z-orientation and a size calculator 32 is arranged to process each frame of image data to identify pixels therein relating to the face of the user 2 and, in dependence upon the identified pixels, to determine the position and size of the user's head in the image, and the orientation of the user's head about an axis perpendicular to the 2D image data plane (which corresponds to an axis parallel to the z-axis of the three-dimensional coordinate space of the 3D computer head model in this embodiment).

Referring to FIG. 2b, the head model processor 34 comprises a transformation calculator 36, a search parameter definer 38, an eye position calculator 40 and a rotator and translator 42.

Transformation calculator 36 is arranged to define a transformation equation to map points from the three-dimensional coordinate space in which the 3D head model of the user is defined into the two-dimensional image space in which a frame of image data received from camera 4 is defined.

Search parameter definer 38 is arranged to define search regions in the three-dimensional space of the 3D head model so as to cover specific parts of the 3D head model, which, as will be described in detail below, comprise the eyes and eyebrows of the 3D head model. In addition, search parameter definer 38 is arranged to define sample points within each search region for subsequent projection into the 2D coordinate space of a frame of image data received from camera 4.

Eye position calculator 40 is arranged to determine positions for the eyes of the 3D computer head model using each frame of image data received from camera 4. This is done by projecting the sample points defined by search parameter definer 38 from the three-dimensional space of the head model into the two-dimensional space of the image data, and processing the intensity values of the image pixels corresponding to the projected points. This processing will be described in detail below.

Rotator and translator 42 is arranged to rotate and translate the 3D computer head model within its three-dimensional coordinate system in dependence upon the results of the processing by position, z-orientation and size calculator 32 and eye position calculator 40. In practice, this is done by changing the values of the rotation and translation components of the transformation equation defined by transformation calculator 36. Again, this processing will be described in detail below.

Referring again to FIG. 2a, gaze direction calculator 44 is arranged to determine the user's eye orientation and to calculate the direction in which the user 2 is looking for each frame of image data based on the determined eye orientation and the position and orientation of the 3D computer head model after it has been rotated and translated by rotator and translator 42.

Data defining the calculated gaze direction may be processed further within processing apparatus 8 by an additional application (not shown) or may be output from the apparatus, for example as data on a data storage medium, such as disc 46, and/or as a signal 48. A recording of the output data may be made by recording the output signal 48 either directly or indirectly using recording apparatus (not shown). More particularly, the data may be output from processing apparatus 8 and stored directly on storage medium 46. Alternatively, the data output from processing apparatus 8 may be stored on a "master" storage medium and then further storage media storing the code may be generated therefrom. In this way, an indirect recording is made of the data. Similarly, the signal 48 carrying output data may be the direct output of processing apparatus 8 or a signal generated indirectly therefrom.

Figure 3A:
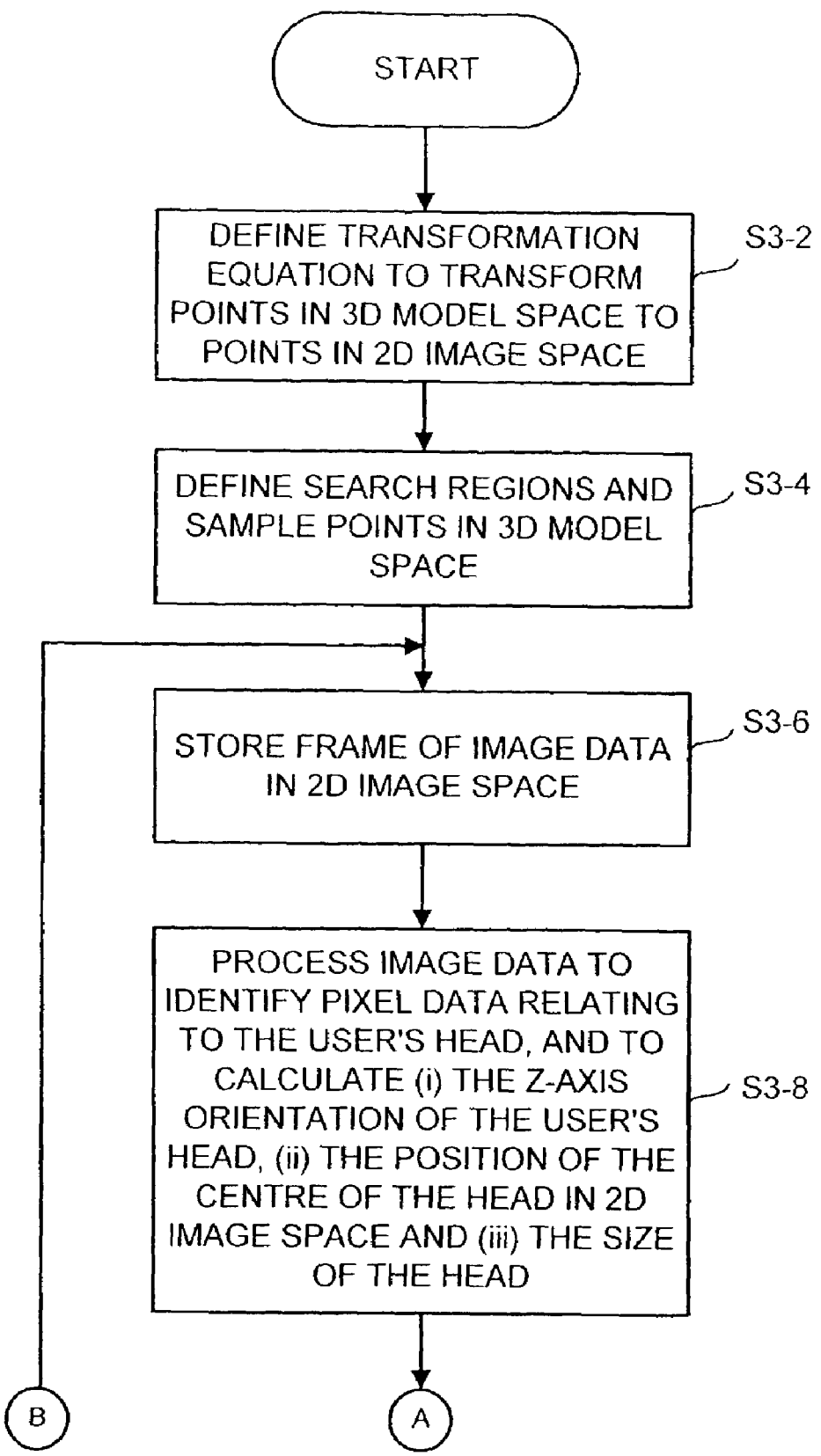
Figure 3B:
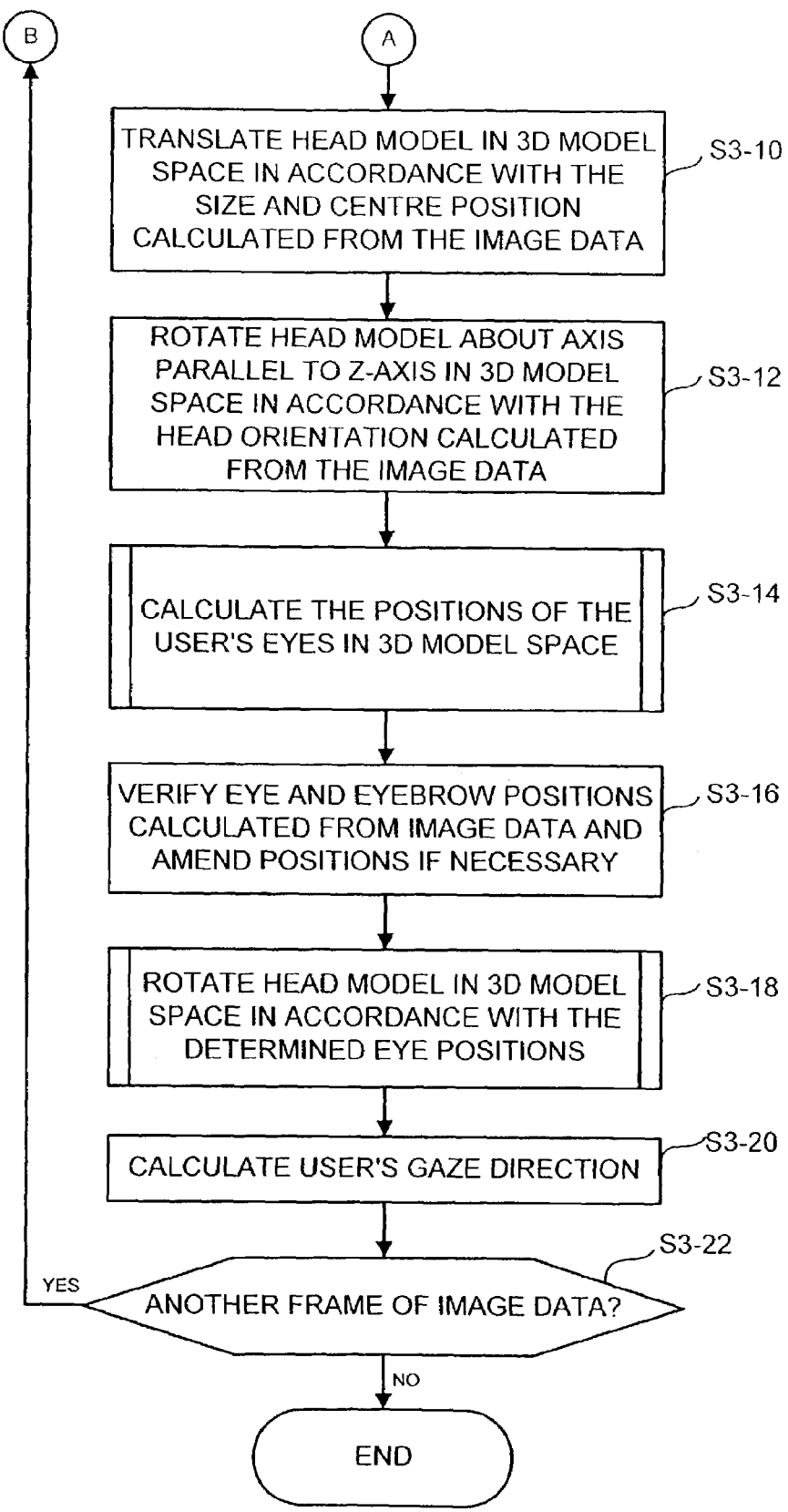

Referring now to FIG. 3, the processing operations performed by the functional components within processing apparatus 8 in this embodiment will now be described.

At step S3-2, transformation calculator 36 defines a transformation equation to map points in the three-dimensional coordinate system in which the 3D computer head model of the user 2 is defined into points in the two-dimensional coordinate system in which each frame of image data received from camera 4 is defined. More particularly, in this embodiment, transformation calculator 36 defines a projective transformation equation in accordance with the camera parameters stored in camera parameter store 26. As explained previously, in this embodiment, the image data for each image recorded by camera 4 is defined in a two-dimensional coordinate system having x and y axes parallel to the x and y axes of the three-dimensional imaging coordinate system of camera 4. The z-axis of the camera coordinate system is defined to lie along the optical axis of the camera 4, so that the origin of the camera coordinate system is at the optical centre of the camera 4. Thus, referring to FIG. 4, a transformation equation is defined which maps points in the 3D head coordinate system "H" to points in the 2D image coordinate system "I" in accordance with the following equation:

$$P_{image} = TSR_z R_y R_x P_{head} \quad (1)$$

where $P_{image}$ is a point in 2D image space $P_{head}$ is a point in 3D head model space T is a translation matrix defining translation in the 3D coordinate system of the 3D computer head model $R_x$, $R_y$ and $R_z$ are rotations about the x, y and z axes respectively in the 3D coordinate system of the 3D computer head model S is a scale matrix defined by $S=(^s/P_z)I$, where s is the scale factor previously stored in camera parameter store 26, $P_z$ is the z-coordinate of $P_{head}$ and I is the identity matrix.

At step S3-2, transformation calculator 36 defines initial values for T, $R_z$ and $R_y$ and $R_x$ which map the 3D computer head model into 2D image space such that the head is at the centre of the image, is front-facing, and has a predetermined size. As will be explained below, T, $R_z$, $R_y$ and $R_x$ are updated to define movement of the 3D computer head model representing real world movement of the head of user 2 determined from image data received from camera 4.

Referring again to FIG. 3, at step S3-4, search parameter definer 38 defines search regions within the three-dimensional coordinate system of the 3D computer head model together with a plurality of sample points within each search region. In this embodiment, search parameter definer 38 defines a set of search regions for use in calculating y-coordinates of the eyes and eyebrows in the three-dimensional coordinate system and a set of search regions for use in calculating x-coordinates of the eyes and eyebrows in the three-dimensional coordinate system.

Figure 5:
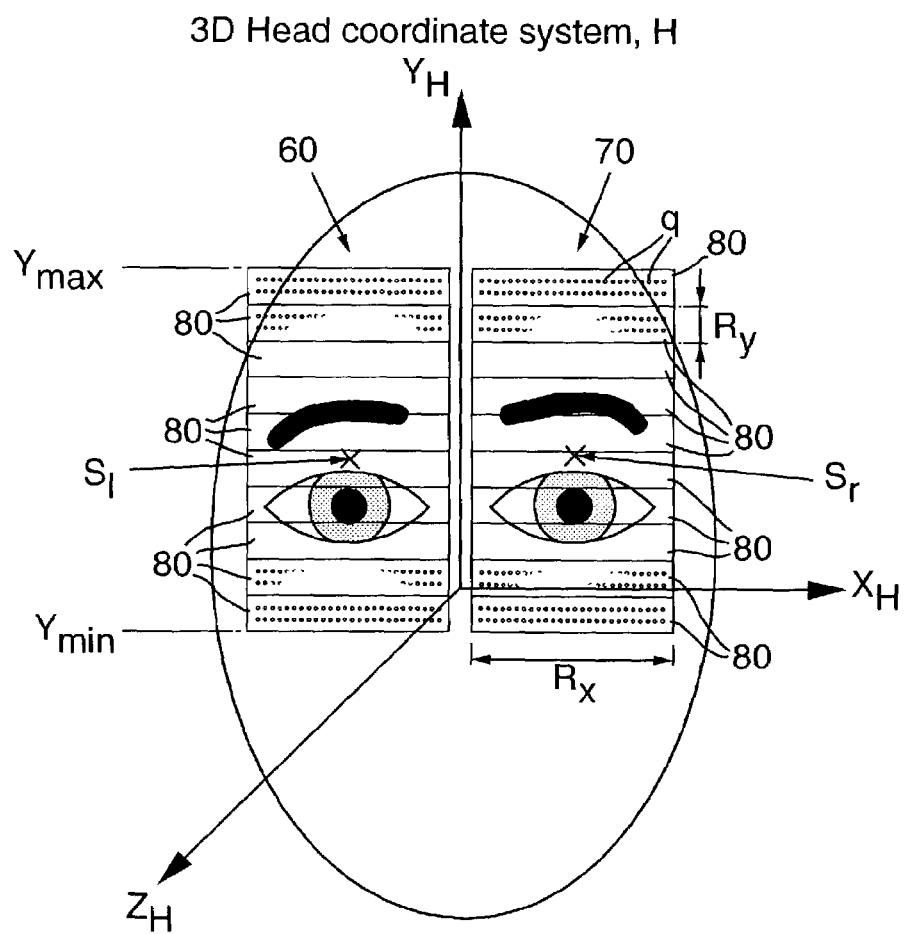
FIG. 5 illustrates the search regions and sample points defined at step S3-4 in FIG. 3 for use in determining the y-axis positions of the user's eyes and eyebrows.

FIGS. 5 and 6 show the search regions defined at step S3-4 by search parameter definer 38 in this embodiment. Referring to FIG. 5, the set of search regions defined by search parameter definer 38 within the three-dimensional coordinate system of the 3D computer head model for use in determining the y-axis positions of the head model's eyes and eyebrows in the 3D space are shown.

More particularly, search parameter definer 38 defines a left group 60 of search bands 80 and a right group 70 of search bands 80 arranged on either side of the head symmetry line (which, in this embodiment, is defined by the y-axis of the three-dimensional coordinate space).

In this embodiment, the search bands 80 within each group 60,70 are adjacent and non-overlapping. Each search band 80 is defined relative to the 3D computer head model so that the search bands move with the head model when it is translated and rotated within the three-dimensional coordinate system.

Search parameter definer 38 defines the bands 80 within each group 60,70 to lie between y-axis limits of $Y_{min}$ and $Y_{max}$. These limits are defined to ensure that the search bands 80 within each group cover fully the left eye and left eyebrow and the right eye and right eyebrow, respectively of the 3D computer head model.

The centre, $S_l$, of the left group 60 of search bands and the centre, $S_r$, of the right group 70 of search bands are defined as follows:

$$S_l = \frac{E_l + B_l}{2} \quad (2)$$

$$S_r = \frac{E_r + B_r}{2} \quad (3)$$

where $E_l$ and $B_l$ are the x,y-positions of the centres of the left eye and left eyebrow, respectively, in the 3D coordinate system of the head model, and $E_r$ and $B_r$ are the x,y-positions of the centres of the right eye and right eyebrow, respectively, in the 3D coordinate space.

Thus, the centre of each group 60,70 is the mid-point in the y-axis direction between the centre of an eye and the corresponding eyebrow.

Each search band 80 is defined, in this embodiment, to be a rectangular region centred on a point lying on a perpendicular line between $Y_{max}$ and $Y_{min}$ which passes through the point $S_l$ or $S_r$. Accordingly, each search band lies in a plane perpendicular to the z-axis of the 3D coordinate system. In this embodiment, the z-coordinate value of the plane containing the search bands is set such that it is equal to the z-coordinate value of the eyes of the 3D computer head model (with the result that the plane passes through the 3D computer head model).

The width of each search band 80 in the x-axis direction is $R_x$. Search parameter definer 38 defines $R_x$ to ensure that each search band 80 is sufficiently wide in the x-axis direction to enclose fully an eye or eyebrow.

The width of each search band 80 in the y-axis direction is $R_y$. Search parameter definer 38 defines $R_y$ to ensure that each band is sufficiently wide to enclose an eye pupil or eyebrow, but is sufficiently narrow to ensure that each search band 80 cannot enclose both a part of an eye pupil as well as a part of an eyebrow. In this embodiment, $Y_{max}$, $Y_{min}$ and $R_y$ are such that there are 10 search bands 80 in each group 60,70 as shown in FIG. 5 (although a different number of search bands 80 could, of course, be set).

Within each respective search band 80, search parameter definer 38 defines a plurality of sample points, "q" (shown for only some of the search bands 80 in FIG. 5 but, in practice, defined for each search band 80). In this embodiment, the number of samples points "q" is defined to be the same for each search band 80, and the number for each search band is selected to be in the range 20 to 50 points, which are evenly spaced throughout the search band.

FIGS. 6a to 6f show the set of search regions defined at step S3-4 by search parameter definer 38 within the three-dimensional coordinate system of the 3D computer head model for subsequent use in determining the x-axis positions of the head model's eyes and eyebrows in the three-dimensional space.

Referring to FIGS. 6a to 6f, search parameter definer 38 defines a plurality of groups 100,110,120,130,140 of search bands 90. Each group 100–140 comprises four search bands 90, which, in this embodiment, have the same dimensions $R_x$ and $R_y$ as the search bands 80 described above.

Each search band 90 lines in the same plane perpendicular to the z-axis as the search bands 80, and is defined relative to the 3D computer head model so that the search bands move with the head model when it is translated and rotated within the three-dimensional coordinate system.

Within each group 100–140, the relative positions of the four search bands 90 is the same. More particularly, the centres of the top two search bands 90 are constrained to lie on a line $Y_B$ parallel to the x-axis which passes through the centre of the eyebrows in the 3D computer head model. Similarly, the centres of the lower search bands 90 are constrained to lie on line $Y_E$ parallel to the x-axis which passes through the centre of the eye pupils in the 3D computer head model. Thus, the distance between the centres of the upper and lower search bands is $Y_B-Y_E$, as shown in FIG. 6a. The distance between the centres of the search bands 90 in the x-axis direction is defined, in this embodiment, to be equal to the distance in the x-axis direction between the points $S_l$ and $S_r$, where $S_l$ and $S_r$ are defined by equations (2) and (3) above.

Search parameter definer 38 defines each group 100–140 of search bands so that each respective group 100–140 is displaced in the x-axis direction relative to all of the other groups 100–140, as shown in FIGS. 6b to 6f (although, as noted above, the y-axis positions of each group 100–140 are the same). Accordingly, referring to FIGS. 6b to 6f, this can be thought of as sliding the group 100 parallel to the x-axis while keeping the relative positions of the search band 90 within the group fixed to define new groups 110, 120, 130 and 140 at different positions in the x-axis direction.

Although only five groups 100–140 are shown in FIGS. 6b to 6f, in this embodiment, search parameter definer 38 defines eight groups of search bands evenly spaced between a minimum x-coordinate limit $X_{min}$ and a maximum x-coordinate limit $X_{max}$ (although a different number of groups could, of course, be set). Consequently, although not shown in FIGS. 6b to 6f, the search bands 90 from the different groups overlap each other.

The x-coordinate limits $X_{min}$ and $X_{max}$ are defined so that the eyes and eyebrows in the 3D computer head model lie fully between these limits. As shown in FIG. 6b and FIG. 6f, the outermost groups 100 and 140 are defined so that the centres of the outermost search bands 90 have x-axis coordinates corresponding to $X_{min}$ and $X_{max}$, respectively.

Within each search band 90, search parameter definer 38 defines a plurality of sample points, "q", (shown for one search band 90 only in FIGS. 6b to 6f but, in practice, defined for each search band 90). In this embodiment, the number of sample points "q" is defined to be the same for each search band 90, and the number for each search band is selected to be in the range of 20 to 50 points, which are evenly spaced throughout the search band.

Referring again to FIG. 3, at steps S3-6 to S3-22, processing apparatus 8 processes each frame of image data received from camera 4 to calculate the position, size and z-axis orientation of the head of the user 2 in each frame, to calculate eye positions in three-dimensional space for the 3D computer head model, and to translate and rotate the 3D computer head model of the user in accordance with the results of the calculations. In addition, in this embodiment, processing apparatus 8 calculates the user's gaze direction for each image frame in dependence upon the user's eyeball orientation and the translated and rotated 3D computer head model. This processing will now be described in detail. It should be noted, however, that steps S3-2 and S3-4 described above are performed only once and are not repeated as part of the processing for each frame of image data described below.

At step S3-6, the next frame of image data received from camera 4 is stored in image data store 28 as digital pixel data under the control of central controller 20.

At step S3-8, position, z-orientation and size calculator 32 processes the image data stored at step S3-6 to identify pixels therein relating to the head of the user 2, and to process the identified pixel data to determine:

(i) the orientation of the user's head about an axis through the centre of the head perpendicular to the 2D image plane (which corresponds to an axis parallel to the z-axis of the 3D coordinate system in which the 3D computer head model is defined in this embodiment);

(ii) the position of the centre of the user's head in the 2D image space; and (iii) the size of the user's head.

In this embodiment, the processing at step S3-8 is performed in a conventional manner, for example as described in "Computer Vision Face Tracking for Use in a Perceptual User Interface" by Bradski, Intel Technology Journal Q2 1998 available at http://developer.intel.com/technology/ITJ/Q21998/articles/art-2.htm.

At step S3-10, rotator and translator 42 changes the position of the 3D computer head model within its 3D coordinate system in accordance with the size and centre positions calculated at step S3-8. More particularly, rotator and translator 42 moves the 3D computer head model in the z-axis direction in accordance with the determined size, and moves the 3D computer head model in the xy plane in accordance with the determined centre position. This is achieved by changing the translation matrix T in equation (1) above.

At step S3-12, rotator and translator 42 rotates the 3D computer head model about an axis through the centre of the head parallel to the z-axis in the 3D model space coordinate system in accordance with the head orientation calculated at step S3-8. This is achieved by changing the rotation $R_z$ in equation (1) above.

At steps S3-14 to S3-18, head model processor 34 performs processing to determine the positions for the eyes of the 3D computer head model in three-dimensional space using the image data stored in image data store 28, and to rotate the 3D computer head model about respective axes through the centre of the head parallel to the x-axis and y-axis in dependence upon the determined eye positions.

More particularly, at step S3-14, eye position calculator 40 performs processing to process the stored frame of image data to determine the positions of the eyes of the user 2 within the three-dimensional coordinate system of the 3D computer head model.

Figure 7:
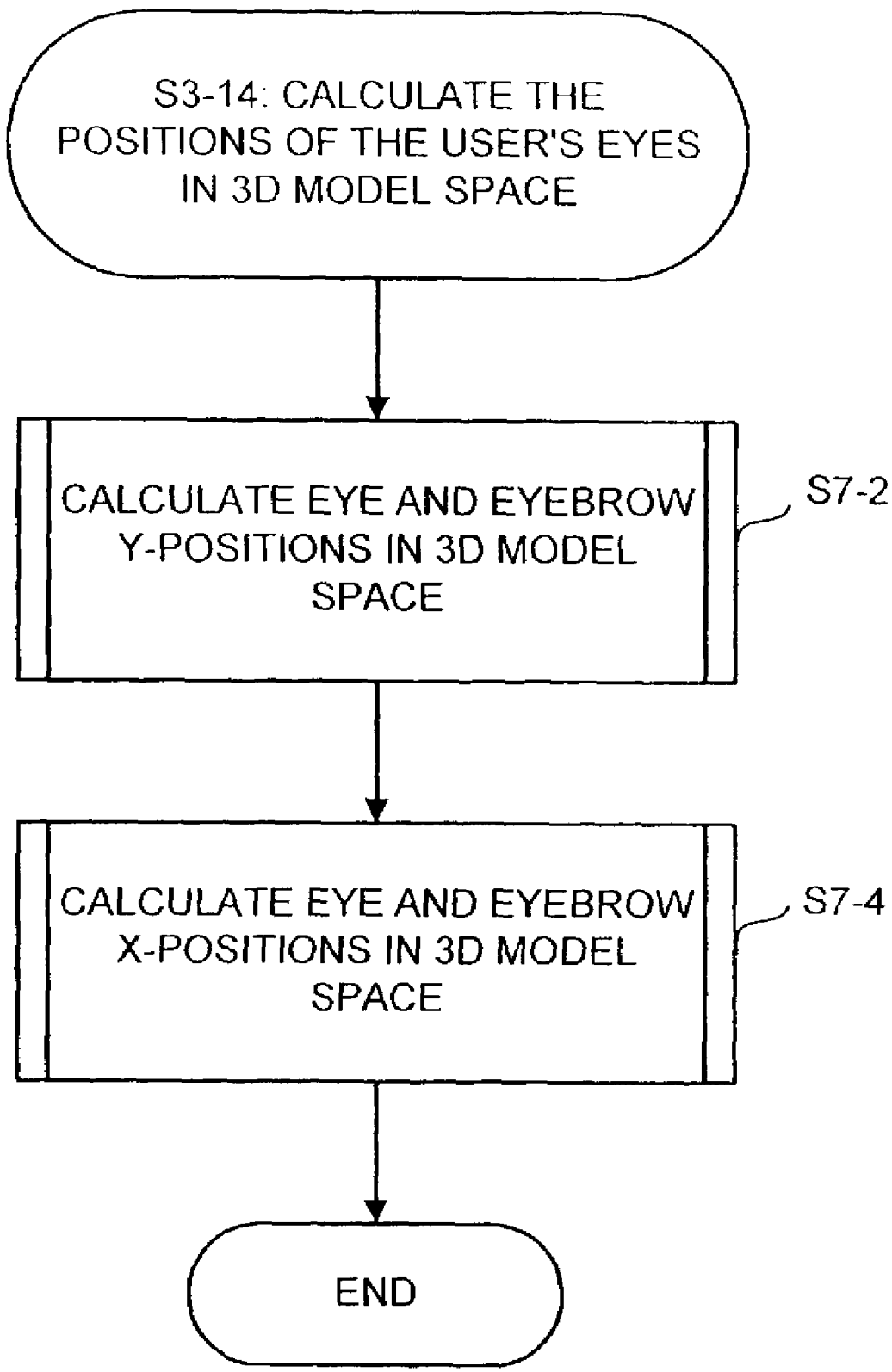
FIG. 7 shows the processing operations performed at step S3-14 in FIG. 3.

FIG. 7 shows the processing operations performed by eye position calculator 40 at step S3-14.

Referring to FIG. 7, at step S7-2, eye position calculator 40 performs processing to calculate the y-coordinate positions of the eyes and eyebrows of the user 2 within the three-dimensional coordinate system of the 3D computer head model.

Figure 8A:
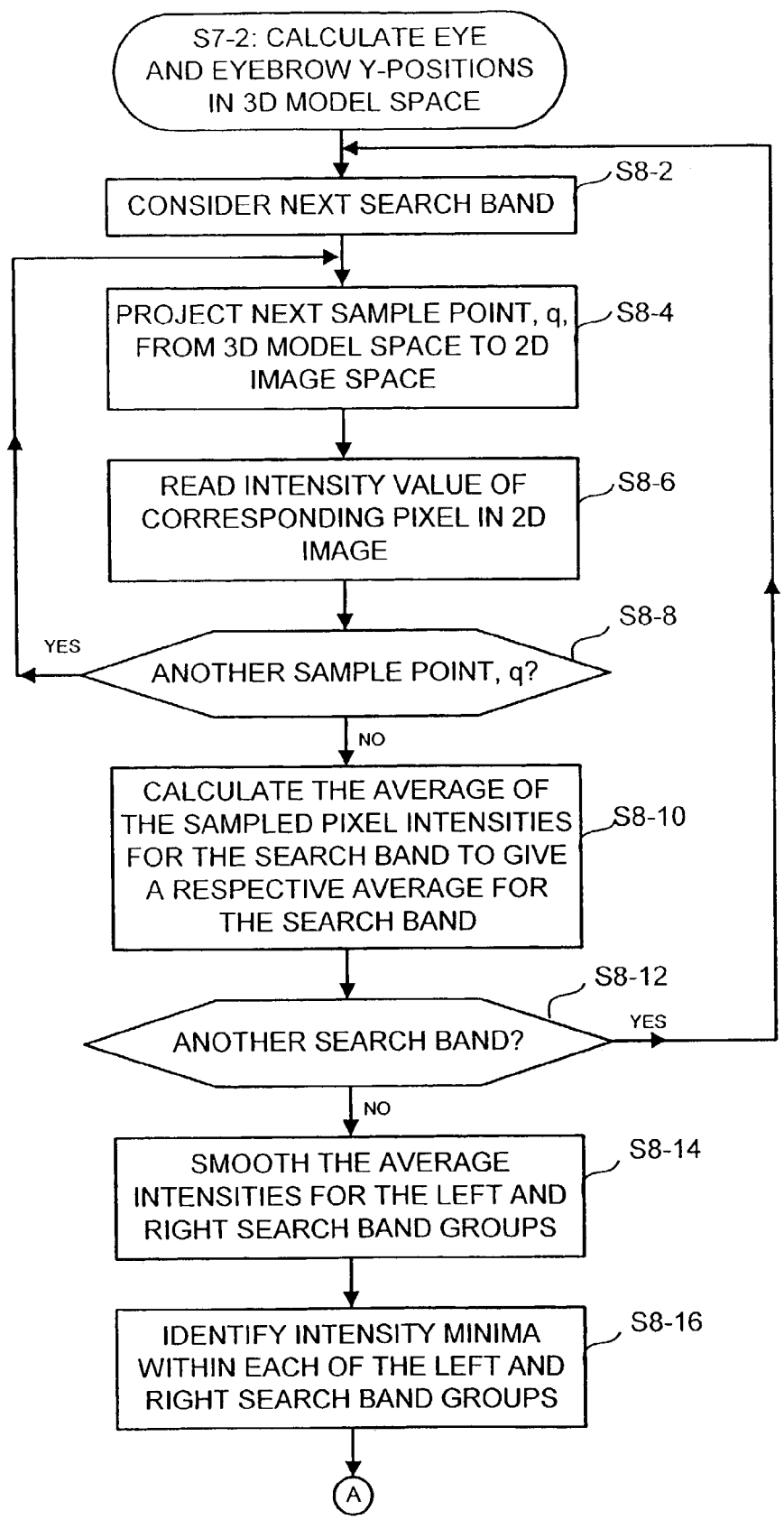
FIGS. 8a and 8b show the processing operations performed at step S7-2 in FIG. 7.
Figure 8B:
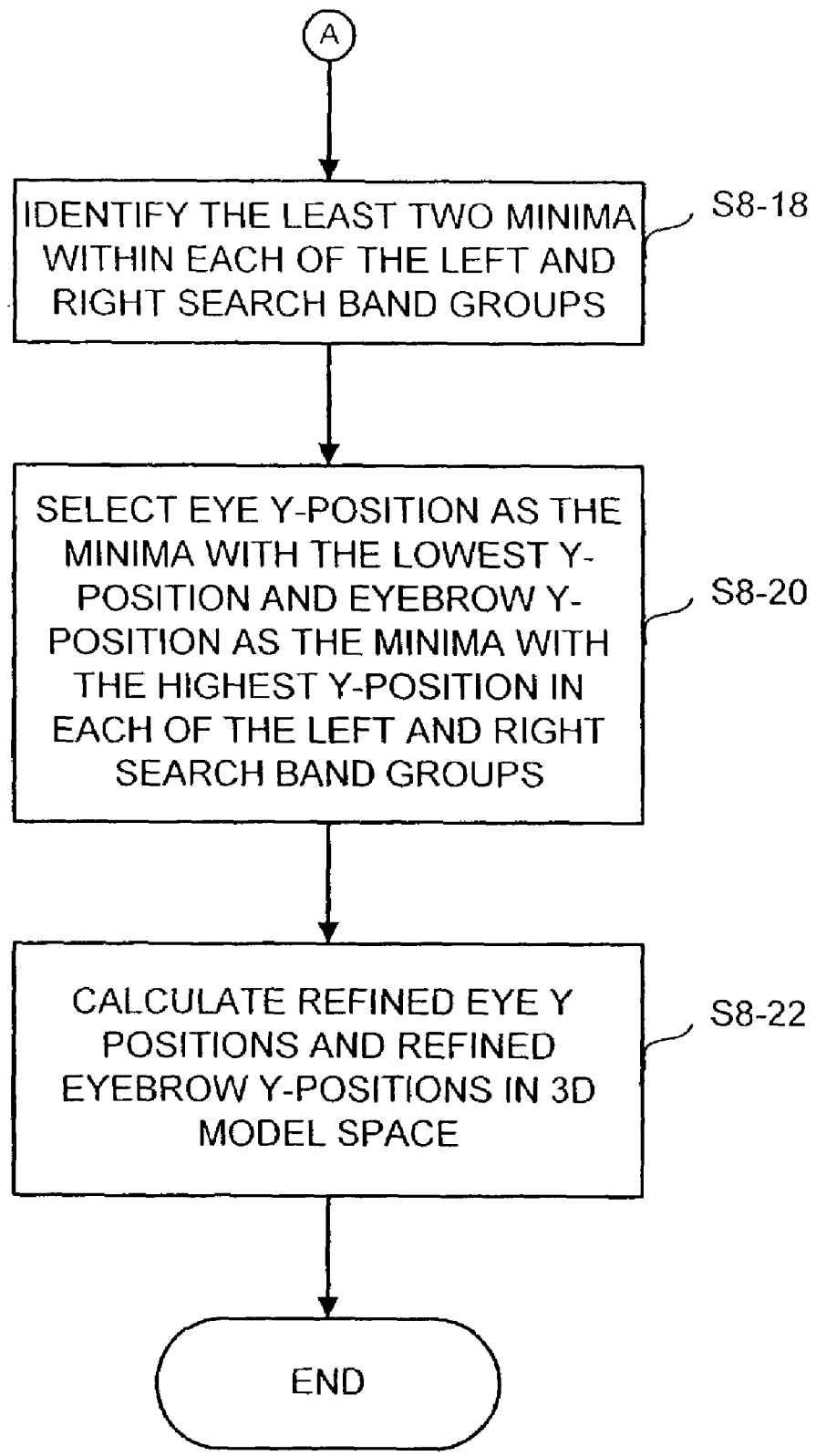

FIG. 8 shows the processing operations performed by eye position calculator 40 at step S7-2.

Referring to FIG. 8, at step S8-2, eye position calculator 40 considers the next search band 80 (FIG. 5) previously defined at step S3-4 for the y-coordinate eye and eyebrow calculations (this being the first such search band 80 the first time step S8-2 is performed).

At step S8-4, eye position calculator 40 projects the next sample point "q" defined at step S3-4 for the search band currently being considered from the three-dimensional coordinate system of the 3D computer head model to the two-dimensional coordinate system of the image data. More particularly, eye position calculator 40 projects the sample point "q" using the transformation equation previously defined at step S3-2 and updated at steps S3-10 and S3-12 (as well as step S3-18 if step S3-18 has previously been performed), which maps points from 3D model space to 2D image space.

It should be noted that the search band 80 selected at step S8-2 and the sample point "q" selected at step S8-4 have a position and orientation within the three-dimensional coordinate space of the 3D computer head model determined by the translation and rotation of the 3D computer head model at step S3-10 and S3-12, as well as steps S3-18 (described below) if step S3-18 has already been performed for a previous frame of image data. Accordingly, each search band 80 will map with representative distortion onto an area in the image corresponding to approximately the same position on the face in the image as the position of the search band relative to the 3D computer head model. This facilitates reliable tracking of the eyes of the user 2 through the sequence of the frames of image data received from camera 4.

At step S8-6, eye position calculator 40 reads an image value of the image pixel onto which the sample point "q" was projected at step S8-4. In this embodiment, eye position calculator 40 reads the grey-scale intensity value of the pixel.

At step S8-8, eye position calculator 40 determines whether there is another sample point "q" in the search band 80 currently being considered. Steps S8-4 to S8-8 are repeated until each sample point q in the search band has been processed in the way described above.

At step S8-10, eye position calculator 40 calculates the average of the pixel intensity values read at step S8-6 for the search band currently being considered, to give a single average value for the search band.

At step S8-12, eye position calculator 40 determines whether there is another search band 80 to be processed. Steps S8-2 to S8-12 are repeated until each search band 80 within the left group of bands 60 and within the right group of bands 70 (FIG. 5) has been processed in the way described above. Consequently, as a result of this processing, eye position calculator 40 calculates a respective average pixel intensity value for each search band 80.

At step S8-14, eye position calculator 80 performs processing to spatially smooth the average intensities for the search bands 80 in the left group 60 and performs processing to spatially smooth the average intensities for the search bands 80 in the right group 70.

More particularly, in this embodiment, eye position calculator 40 performs the smoothing processing by convolving the average intensity values for the search bands in the left group with a rectangle function (of size 3 in this embodiment) and convolving the average pixel intensity values for the search bands in the right group with a rectangle function (again of size 3 in this embodiment). This spatial smoothing removes artefacts in the average intensities caused by the search bands 80 within the respective left and right groups 60,70 being defined without an overlap.

As a result of the processing at steps S8-2 to S8-14, eye position calculator 40 has calculated values representative of the intensity of the pixels in the stored image data for search bands arranged in left and right groups in the y-axis direction of the three-dimensional coordinate space of the 3D computer head model and covering the eyes and eyebrows of the head.

At steps S8-16 to S8-22, eye position calculator 40 processes the calculated intensity values to determine the y-coordinate positions of the user's eyes in the three-dimensional coordinate space of the 3D computer head model based on the positions of the minima in the intensity values which represent dark regions on the user's face corresponding to his eyebrows and eyes.

More particularly, at step S8-16, eye position calculator 40 identifies minima within the smoothed intensity values of the left group 60 and minima within the smoothed intensity values of the right group 70, where a minima is defined to be a search band 80 being a smoothed average intensity value for which the smoothed average intensity values of the second bands on both sides of it are larger.

At step S8-18, eye position calculator 40 identifies the least two minima from those identified at step S8-16 for the left group 60 and also identifies the least two minima for the right group 70 (the least two minima in each case being the minima of lowest intensity value). The two identified least minima in each group correspond to the y-positions of the user's eyebrow and eye.

At step S8-20, using the principle that an eye of the user will always be below an eyebrow, eye position calculator 40 selects the left eye y-position in the three-dimensional coordinate system of the 3D computer head model as the y-coordinate of the centre of the search band 80 having the minima in the left group 60 identified at step S8-18 which has the lowest y-position. In addition, eye position calculator 40 selects the left eyebrow y-position in the three-dimensional coordinate system of the 3D head model as the y-coordinate of the centre of the search band 80 having the minima in the left group 60 identified at step S8-18 having the highest y-position. Eye position calculator 40 selects the right eye y-position and right eyebrow y-position in the three-dimensional coordinate system of the 3D head model in the same way using the relative y-positions of the minima identified at step S8-18 in the right band 70.

At this stage in the processing, the y-positions of the left eyebrow, right eyebrow, left eye and right eye are those of the centre of the search bands 80 containing the minima identified at step S8-18 and selected at step S8-20.

To calculate more accurate y-position values, eye position calculator 40 performs additional processing in this embodiment at step S8-22.

More particularly, at step S8-22, eye position calculator 40 calculates a respective refined y-position for each of the user's left eyebrow, left eye, right eyebrow and right eye using a parabolic curve technique.

The processing performed at step S8-22 is illustrated in FIG. 9.

Referring to FIG. 9, eye position calculator 40 considers the smoothed averaged intensity values 150,152 calculated at step S8-14 for the search bands 80 on each side of the search band 80 containing the minima 154 selected at step S8-20 having the y-coordinate value 156 which is to be refined. Eye position calculator 40 then defines a parabola 160 passing through the points 162 and 164 defined by coordinate pairs comprising an x-coordinate of the respective smoothed average intensity value and a y-coordinate of the centre of the search band 80 for which the smoothed average intensity value was calculated. Eye position calculator 40 then identifies the minima 170 of the parabola 160 and defines the y-coordinate value 180 of the parabola minima to be the refined y-coordinate for the eye or eyebrow for which the calculation has been performed. This processing is repeated for each of the left eyebrow, left eye, right eyebrow and right eye to calculate respective refined y-coordinates therefor.

Referring again to FIG. 7, at step S7-4, eye position calculator 40 performs processing to calculate respective x-positions in the three-dimensional coordinate space of the 3D computer head model for the left eye, left eyebrow, right eye and right eyebrow.

Figure 10A:
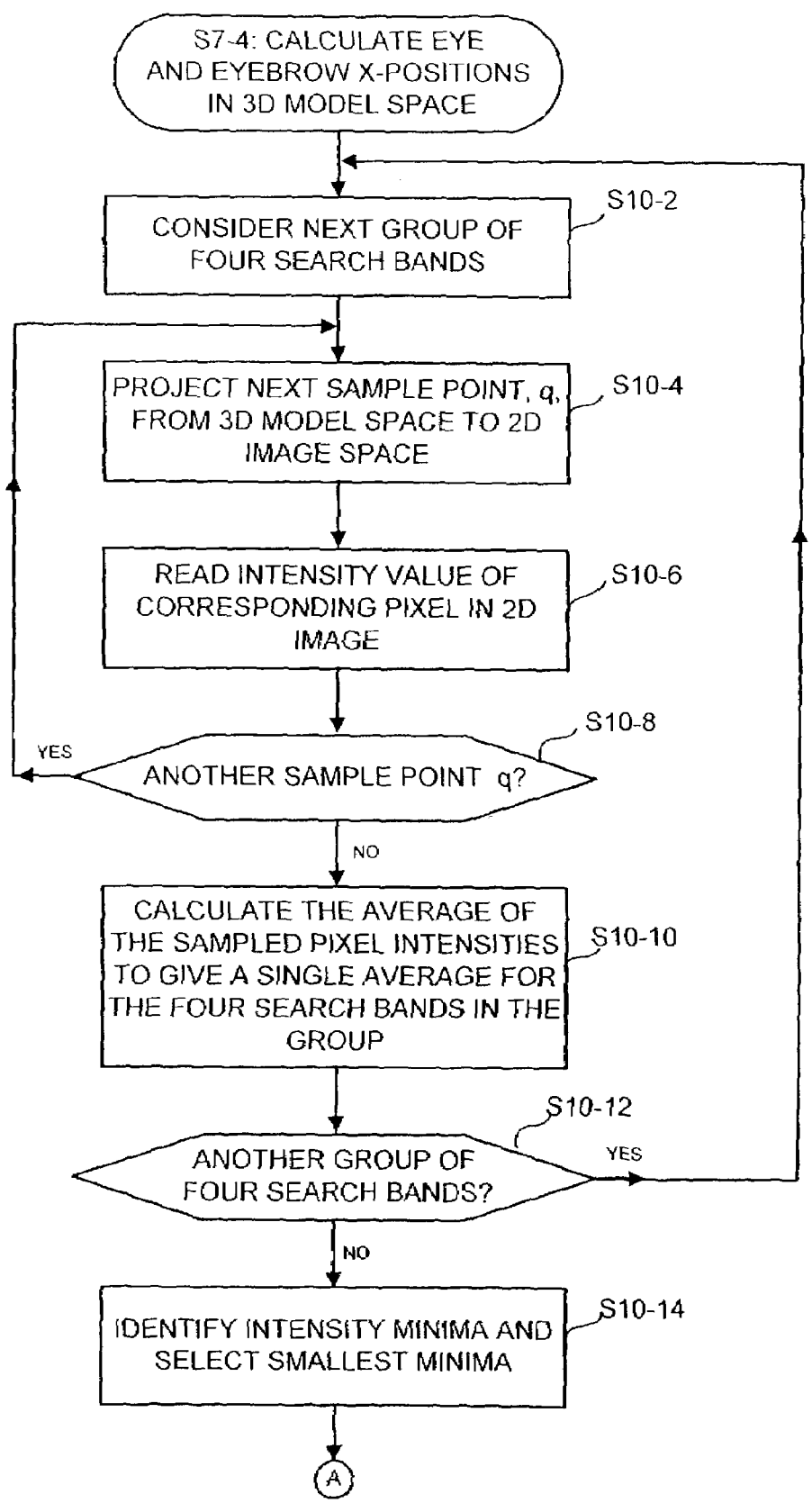

FIG. 10 shows the processing operations performed by eye position calculator 40 at step S7-4.

Referring to FIG. 10, at step S10-2, eye position calculator 40 considers the next group 100–140 of search bands 90 (FIG. 6) previously defined at step S3-4 for the calculation of x-coordinates (this being the first such group the first time step S10-2 is performed).

At step S10-4, eye position calculator 40 projects the next sample point "q" for the group 100–140 of search bands currently being considered from the three-dimensional coordinate space of the 3D computer head model to the two-dimensional coordinate space of the image data (this being the first such sample point "q" the first time step S10-4 is performed). This projection is carried out using the transformation equation previously defined at step S3-2 and updated at steps S3-10 and S3-12 (as well as step S3-18 if step S3-18 has previously been performed).

At step S10-6, eye position calculator 40 reads an image value of the pixel in the image data onto which the sample point "q" was projected at step S10-4. In this embodiment, eye position calculator 40 reads the grey-scale intensity value of the pixel.

At step S10-8, eye position calculator 40 determines whether there is another sample point "q" within the group of four search bands currently being considered, and steps S10-4 to S10-8 are repeated until each such sample point has been processed in the way described above.

At step S10-10, eye position calculator 40 calculates the average of the sampled pixel intensity values read at step S10-6 to give a single average intensity value for the group of four search bands 90 currently being considered.

At step S10-12, eye position calculator 40 determines whether there is another group 100–140 of four search bands 90 to be processed. Steps S10-2 to S10-12 are repeated until each group of four search bands has been processed in the way described above.

At step S10-14, eye position calculator 40 identifies minima within the average intensity values calculated at step S10-10 (a minima being defined to be a value where the average intensity values for the group of four search bands on both sides are larger).

Eye position calculator 40 then selects the smallest minima (that is, the average intensity minima having the lowest value). The four centres of the search bands 90 for the group having the selected smallest minima define the x-coordinates in the three-dimensional coordinate system of the user's eyes and eyebrows. This is because the eyes and eyebrows produce dark regions in the image data received from camera 4 and these regions and identified by selecting the smallest minima at step S10-14.

At step S10-16, eye position calculator 40 calculates a refined x-coordinate value of the user's eyes and eyebrows in the three-dimensional coordinate space of the head model. This processing is performed using the parabola technique described previously with reference to step S8-22. However, the processing is carried out once to calculate a refinement applicable to the x-coordinates of both eyes and both eyebrows, rather than carrying out separate processing to calculate a respective refinement for each of the eyes and eyebrows. This is because the x-coordinate values of the eyes and eyebrows determined at step S10-14 are all derived from a single group 100–140 of four search bands.

As a result of the processing described above with reference to FIGS. 8 to 10, eye position calculator 40 has calculated a respective x,y coordinate pair defining the centre of each of the user's eye and eyebrows in the three-dimensional coordinate space of the 3D computer head model.

Referring again to FIG. 3, at step S3-16, eye position calculator 40 performs processing to verify the x,y positions calculated at step S3-14 and to amend the positions should it be determined that this is necessary.

More particularly, eye position calculator 40 determines whether an eye and eyebrow have been identified for the left-hand and right-hand side of the user's face (because it may be the case that the processing at step S8-16 identifies only one minima, or no minima at all, in each of the left and right groups 60,70 of search bands 80), compares the relative calculated positions of the eyes and eyebrows in the three-dimensional space of the 3D computer head model, and performs the verification and amendment processing in accordance with the following rules:

1. If both the eye and eyebrow have been identified for both the left and right sides of the face, then:
    (a) If the identified eye positions lie on a line perpendicular to the y-axis in the 3D coordinate system of the 3D computer head model, then the eye positions are considered to be accurate and no amendment is necessary; else (b) If any of the identified feature positions lie on a line perpendicular to the y-axis in the 3D coordinate system of the 3D computer head model (for example, left eye and right eyebrow), then these are determined to be the eye positions, and the eye position coordinates are amended accordingly.

(2) If only one feature (eye or eyebrow) has been identified on each of the left and right sides of the face, then:

(a) If the positions of the features lie on a line perpendicular to the y-axis in the 3D coordinate system of the 3D computer head model, then these are set to be the positions of the user's eyes; else (b) The position of the feature having the lowest y-coordinate value is set to be the position of the first eye, and the second eye is defined to be at a position having the same y-coordinate value as the first eye and having an x-coordinate value the same as that originally calculated for the feature identified on the same side of the face as the second eye.

3. If only one feature (eye or eyebrow) has been identified on one side of the face and two features have been identified on the other side of the face, then the positions of the eyes are set to be the positions of the features on opposite sides of the face for which the straight line therebetween is closest to parallel to the x-axis.

4. If only one feature (eye or eyebrow) has been identified on one side of the face and no feature has been identified on the other side of the face, then the position of the identified feature is defined to be the position of the first eye, and the position of the second eye is defined to have the same y-coordinate value and an equal and opposite x-coordinate value.

At step S3-18, head model processor 34 rotates the 3D computer head model within its three-dimensional coordinate system in accordance with the eye positions calculated at steps S3-14 and S3-16. The eyebrow positions calculated at steps S3-14 and S3-16 are not used in this embodiment to rotate the 3D computer head model at step S3-18 because the user can move his eyebrows on his head, and it has been found that this can lead to the 3D computer head model being rotated inaccurately if the eyebrow positions are used at step S3-18 as well as, or instead of, the eye portions.

Figure 11:
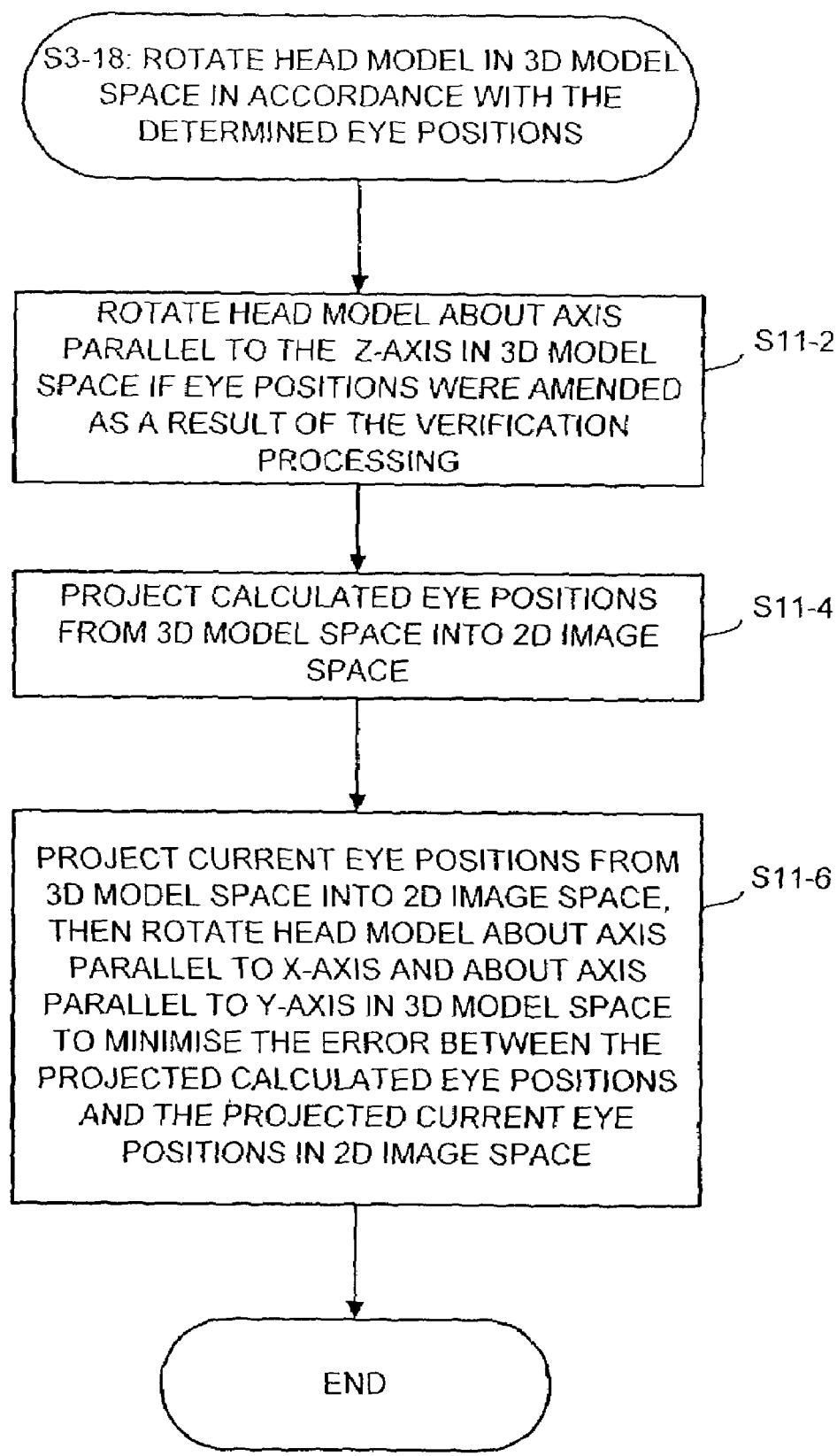
FIG. 11 shows the processing operations performed at step S3-18 in FIG. 3.

FIG. 11 shows the processing operations performed at step S3-18.

Referring to FIG. 11, at step S11-2, if the calculated eye positions were changed during the verification processing at step S3-16, then rotator and translator 42 rotates the 3D computer head model about an axis parallel to the Z-axis of the three-dimensional coordinate system in accordance with the change in the calculated eye positions. More particularly, rotator and translator 42 rotates the 3D head model about an axis through the centre of the head and parallel to the z-axis so that the symmetry plane of the 3D computer head model (that is, the notional "vertical" plan through the centre of the head model which divides the head model into left-hand and right-hand sides) is perpendicular to the straight line connecting the amended eye positions. This is achieved by changing the rotation $R_z$ in equation (1) above.

At step S11-4, head model processor 34 projects (using the transformation defined at step S3-2 and subsequently updated as described above) the eye positions calculated as a result of the processing at step S3-14 (and amended, if necessary, during the processing at step S3-16) from the three-dimensional coordinate system of the 3D computer head model into the 2D coordinate system of the frame of image data stored in image data store 28 and currently being processed. These projected positions define the calculated eye positions in 2D image space.

At step S11-6, head model processor 34 performs processing to determine the rotation of the 3D computer head model about an axis through the centre of the head model parallel to the x-axis ($R_x$ in equation (1)) and an axis through the centre of the head model parallel to the y-axis ($R_y$ in equation (1)) of the three-dimensional coordinate system which orientates the head so that the eyes thereof project to the same positions in the 2D image space as the calculated eye positions generated at step S11-4.

More particular, in this embodiment, head model processor 34 projects the current eye positions (that is, the positions of the eyes in the 3D computer head model in its current orientation $R_x R_y$) from the three-dimensional coordinate system of the 3D computer head model into the 2D coordinate system of the image data. Each point is projected using the transformation previously calculated at step S3-2 and subsequently updated as described above.

Head model processor 34 then iteratively rotates the 3D computer head model in its three-dimensional space about axes through the centre of the head parallel to the x-axis and y-axis (by iteratively changing $R_x$ and $R_y$ in equation (1)) to minimise the error between the projected calculated eye positions and the projected current eye positions in 2D image space. In this embodiment, this processing is carried out using a spring-mass-damper type numerical technique.

More particularly, head model processor 34 performs the following operations a predetermined number of times (set to 8 times in this embodiment):

CALCULATE $\underline{y}''_n = \frac{K}{m}(\underline{E}_l + \underline{E}_r)_n - \frac{B}{m}\underline{y}''_{n-1}$ CALCULATE $\underline{y}'_n \underline{y}'_{n-1} + \underline{y}''_n \Delta t$ ROTATE $\Theta_x = \Theta_x + V_y$ ROTATE $\Theta_y = \Theta_y + V_x$

REPROJECT CURRENT EYE POSITIONS INTO 2D IMAGE SPACE where:

"K" is a spring constant (set to 0.002 in this embodiment).

"B" is a damper constant (set to 2 in this embodiment).

"m" is a mass (set to 1 in this embodiment).

$E_l$ is the error vector between the projected calculated position and projected current position of the left eye.

$E_r$ is the error vector between the projected calculated position and projected current position of the right eye.

"n" indicates a value for the current iteration.

"n−1" indicates a value for the previous iteration ($\underline{y}'_{n-1}$ being set to 0 for n=1).

$\Delta t$ is a constant (set to 0.1 in this embodiment).

$V_x$ is the x component of $\underline{y}'$ $V_y$ is the y component of $\underline{y}'$.

As a result of this processing, the 3D computer head model is rotated about axes through the centre of the head parallel to the x-axis and y-axis of the three-dimensional coordinate system to minimise the error vectors in a stable manner. That is, values of $R_x$ and $R_y$ in equation (1) are calculated which give a minimum error.

Referring again to FIG. 3, as a result of the processing at step S3-18, head model processor 34 has changed the orientation of the 3D computer head model defined by the data stored in head model store 24 so that its orientation corresponds to the orientation of the head of user 2 determined from the image data received from camera 4. In other words, the values of T, $R_x$, $R_y$ and $R_z$ in equation (1) define the position and orientation of the 3D computer head model calculated from the current frame of image data.

At step S3-20, gaze direction calculator 44 determines the direction in which the user 2 is looking. In this embodiment, gaze direction calculator 40 performs the calculation by processing the image data stored in image data store 28 to determine the positions of the irises and pupils of the eyes of the user 2 relative to the rest of the eyes, and then uses the calculated positions together with the determined position and orientation of the 3D computer head model (determined at steps S3-10, S3-12 and S3-18) to calculate the direction in which the user 2 is looking.

The processing to calculate the positions of the irises and pupils within the eyes of the user 2 is carried out by gaze direction calculator 44 in a conventional manner, for example by extracting pixels from the image data relating to the eyes, scaling the pixel data to give an image of each eye of a predetermined size (so that an image is obtained at the same size regardless of the distance of the user 2 from the camera 4), and processing the generated image of each eye to identify a dark circle surrounded by a white region, and the position of the dark circle relative to the white region.

As a result of performing the processing described above, processing apparatus 8 has calculated the gaze direction of the user 2 for the current frame of the image data received from camera 4.

At step S3-22, central controller 20 determines whether another frame of image data has been received from camera 4. Steps S3-6 to S3-22 are repeated for each frame of image data received from the camera 4.

Second Embodiment

A second embodiment of the invention will now be described.

In the first embodiment, search bands 80 are defined in the three-dimensional coordinate space of the 3D head model covering regions corresponding to the left and right eyes and eyebrows. For each frame of image data received from camera 4, sample points q for each search band 80 are projected from the three-dimensional space of the 3D computer head model into the two-dimensional space of the image, and the intensity value of each pixel onto which a sample point projects is read. An average intensity value for each search band 80 is then calculated from the intensity values read for the sample points within the search band. The positions of the user's eyes and eyebrows in the three-dimensional coordinate space of the head model are then determined in dependence upon the positions of intensity minima within the left group 60 of search bands 80 and right group 70 of search bands 80.

In the second embodiment, on the other hand, the programming instructions input on storage medium 16 and/or signal 18 comprise instructions to cause the processing apparatus 2 to become configured to define search bands in the three-dimensional coordinate space of the 3D computer head model such that each band comprises a line (instead of an area having a width $R_y$ as in the first embodiment) with sample point q defined on the line. For each frame of image data received from camera 4, the intensity value of each pixel in the image data corresponding to a sample point q is read and an average intensity value is calculated for each search band in the three-dimensional coordinate space of the 3D computer head model. As a result, an intensity profile is generated as a function of position over the left and right eyes and eyebrows in the three-dimensional coordinate space of the 3D head model. Each generated profile is compared with a pre-generated intensity profile for the user 2 to calculate a respective Y-coordinate value in the three-dimensional coordinate space of the 3D computer head model for the left eye and the right eye of the 3D computer head model.

Referring to FIG. 12, when programmed by the programming instructions, the functional units in the second embodiment are the same as those in the first embodiment, with the exception that the functional units further comprise a reference intensity profile generator 35 operable to calculate and store a reference intensity profile for the left eye and left eyebrow and a reference intensity profile for the right eye and right eyebrow of each user of the apparatus (these being the reference profiles against which profiles determined for each frame of image data during eye tracking are compared). In addition, the processing operations performed by search parameter definer 38 and eye position calculator 40 are different to the processing operations in the first embodiment. These differences will be described below.

FIG. 13 shows the processing operations performed by the functional components within processing apparatus 8 in the second embodiment.

Referring to FIG. 13, the processing operations performed at steps S13-2, S13-6 to S13-12, and S13-18 to S13-22 are the same as the processing operations performed at steps S3-2, S3-6 to S3-12, and S3-18 to S3-22 in the first embodiment. Accordingly, these processing operations will not be described again here.

On the other hand, the processing operations performed at steps S13-4, S13-5 and S13-14 are different to the processing operations performed in the first embodiment. Accordingly, these processing operations will now be described in detail.

The processing by search parameter definer 38 at step S13-4 will be described first.

Search parameter definer 38 defines search bands for use in calculating Y-coordinates of the eyes of the 3D computer head model and search bands for use in calculating X-coordinates of the eyes of the 3D computer head model. The search bands defined by search parameter definer 38 at step S13-4 for use in calculating the X-coordinates of the eyes of the 3D computer model are the same as those defined in the first embodiment and described above with reference to FIGS. 6a to 6f. However, the search bands defined for use in calculating the Y-coordinates of the eyes of the 3D computer head model are different to those in the first embodiment.

FIG. 14a shows the search bands for use in calculating the Y-coordinates of the eyes of the 3D computer head model defined by search parameter 38 at step S13-4 in the second embodiment.

Referring to FIG. 14a, search parameter definer 38 defines a left group 60 of search bands 200 and a right group 70 of search bands 200 arranged on either side of the head symmetry line (which, in this embodiment, is defined by the Y-axis of the three-dimensional coordinate space, as in the first embodiment).

Each search band 200 is defined relative to the 3D computer head model so that the search bands move with the head model when it is translated and rotated within the three-dimensional coordinate system.

Search parameter definer 38 defines the search bands 200 within each group 60,70 to lie between Y-axis limits of $Y_{min}$ and $Y_{max}$. These limits are the same as those in the first embodiment and are defined to ensure that the search bands 200 within each group 60,70 cover fully the left eye and left eyebrow and the right eye and right eyebrow respectively of the 3D computer head model.

Each search band 200 is defined by search parameter definer 38 in the second embodiment to be a straight line having a centre point lying on a perpendicular line 202 between $Y_{max}$ and $Y_{min}$ which passes through the centre of the left eye and left eyebrow or the centre of the right eye and right eyebrow. Each search band 200 is perpendicular to the lines 202 and lies in a plane perpendicular to the Z-axis of the 3D coordinate system. In this embodiment, the Z-coordinate value of the plane containing the search bands 200 is set such that it is equal to the Z-coordinate value of the eyes of the 3D computer head model (with the result that the plane passes through the 3D computer head model).

Within each group 60,70, the search bands 200 are equally spaced along the line 202 between the limits $Y_{max}$ and $Y_{min}$. In this embodiment, the spacing between adjacent search bands 200 is defined so that, when the search bands 200 are transformed from the three-dimensional coordinate system of the 3D computer head model to the two-dimensional coordinate system of an image, the transformed bands have a spacing in the image equal to the spacing of adjacent lines of pixels in the image. In this way, the search bands 200 correspond to adjacent lines of pixels in the image. Accordingly, although only eleven search bands 200 are shown in FIG. 14a in each of the groups 60,70, in practice 40 search bands 200 are typically defined in each group 60,70.

The width of each search band 80 in the X-axis direction is $R_x$ (this being the same width as the search bands 80 in the first embodiment). Search parameter definer 38 defines $R_x$ to ensure that each search band 200 is sufficiently wide in the X-axis direction to enclose fully an eye or eyebrow.

Within each respective search band 200, search parameter definer 38 defines a plurality of sample points "q". In this embodiment, the number of sample points q is defined to be the same for each search band 200, and the sample points are evenly spaced throughout the width of the search band 200. In this embodiment, the number of sample points q for each search band 200 is set such that, when the sample points q are projected from the three-dimensional coordinate system of the 3D computer head model to the two-dimensional coordinate system of an image, the spacing between the projected sample points is equal to the spacing between adjacent pixels on a row in the image. Accordingly, although only nine sample points q are shown in FIG. 14a for each search band 200, in practice, 30 sample points q are typically defined for each search band 200.

Although each search band 200 and each sample point q is illustrated in FIG. 14a, in this embodiment, search parameter definer 38 does not actually perform processing at step S13-4 to calculate the position of each search band 200 and each sample point q in the three-dimensional space of the 3D computer head model. Instead, referring to FIG. 14b, search parameter definer 38 defines the positions of eight sample points q 210–224, referred to as "keypoints".

Keypoints 210,212,214 and 216 define the positions of the sample points q at the ends of the two lines 202. Keypoints 218 and 220 define the positions of the sample point q at the ends of one of the search bands 200 in the right group 70 (labelled 226 in FIG. 14b). In this embodiment, the keypoints 218,220 define positions of the sample points q at the ends of the search band 200 which passes through the centre of the line 202 defined by keypoints 210 and 212. Similarly, keypoints 222 and 224 define the positions of sample points q at the ends of a search band 200 in the left group 60 (in this embodiment, the search band 200 which passes through the centre of the line 202 defined by keypoints 214 and 216 and labelled 228 in FIG. 14b).

To define the positions of the other search bands 200 and sample points q, search parameter definer 38 stores data defining the number of search bands 200 in each of the left and right groups 60,70, and data defining the number of sample point q in each respective search band 200.

As will be explained below, instead of projecting every one of the sample points q shown in FIG. 14a from the three-dimensional space of the 3D computer head model to the two-dimensional space of an image in order to calculated Y-coordinates for the eyes of the 3D computer model, in this embodiment only the eight keypoints 210-224 shown in FIG. 14b are projected and the positions to which the other sample points q would be projected are calculated in the two-dimensional space of the image based upon the positions of the projected keypoints 210-224. It has been found that performing processing in this way reduces the amount of computation required compared to processing which projects every individual sample point q from the three-dimensional space of the 3D computer head model to the two-dimensional space of an image.

Referring again to FIG. 3, the processing performed at step S13-5 in the second embodiment to generate and store left and right eye reference intensity profiles for the user will now be described. This processing is performed by the reference intensity profile generator 35. The purpose of the processing is to generate a respective reference intensity profile for the left and right eyes of the current user 2 of processing apparatus 8 for use in subsequent processing to calculate the Y-coordinates of the user's eyes when the user's eyes are being tracked. Each reference intensity profile defines the intensity (determined from an image of the user 2) at each position corresponding to the position of a search band 200 along a respective one of the lines 202. Accordingly, each reference profile defines how the intensity varies along a line 202 through positions corresponding to the pupil of the user's eye and the user's eyebrow.

FIG. 15 shows the processing operations performed by reference intensity profile generator 35 at step S13-5.

Referring to FIG. 15, at step S15-2, reference intensity profile generator 35 processes frames of image data received from camera 4 to determine the 2D positions of the user's eyes within a frame of the image data. In this embodiment, the processing at step S15-2 is performed in a conventional manner to process frames of image data from camera 4 to detect a frame in which the user blinks and to determine the positions of the user's eyes in this frame of image data, for example as described in "Coordination of Perceptual Processes for Computer-Mediated Communication" by Coutaz et al in 1996 Proceedings of 2nd International Conference on Automatic Face and Gesture Recognition, IEEE Computer Security Press, pages 106–111, and "Eigen Space Coding as a Means to Support Privacy in Computer-Mediated Communication" by Coutaz et al in 1977 Proceedings of INTERACT '97, published by Chapman and Hall. Of course, other processing techniques could be used at step S15-2 to determine the positions of the user's eyes in one of the frames of image data.

At steps S15-4 to S15-10, reference intensity profile generator 35 controls position, Z-orientation and size calculator 32 and head model processor 34 to perform processing to translate and rotate the 3D computer head model within its three-dimensional space to position the eyes of the 3D computer model at locations corresponding to the positions in the frame of image data determined at step S15-2. That is, reference intensity profile generator 35 rotates and translates the 3D computer head model to position the eyes such that, when the transformation previously generated at step S13-2 is applied, the eyes project to the positions in the frame of image data calculated at step S15-2.

The processing performed at steps S15-4 to S15-10 is the same as the processing performed in the first embodiment at steps S3-8, S3-10, S3-12 and S11-6 (the only difference being that the processing at step S15-10 is performed to minimise the error between the eye positions determined at step S15-2 and the projected current eye positions rather than to minimise the error between the projected calculated eye positions and the projected current eye positions as in the processing at step S11-6). Since these processing operations have been described above, they will not be described again here.

When rotating and translating the 3D computer head model at steps S15-4 to S15-10, the positions of the eight keypoints 210–224 shown in FIG. 14b will move with the 3D computer head model since they are defined relative to the 3D computer head model.

At steps S15-12 to S15-18, reference intensity profile generator 35 controls head model processor 34 to generate a respective reference intensity profile for each of the lines 202 by reading pixel data from the frame of image data in which the positions of the user's eyes were determined at step S15-2.

More particularly, at step S15-12, reference intensity profile generator 35 projects the eight keypoints 210–224 defined at step S13-4 from the three-dimensional space of the 3D computer head model to the two-dimensional space of the frame of image data in which the positions of the user's eyes were determined at step S15-2. This projection is carried out using the transformation equation previously defined at step S13-2 and updated at steps S15-6, S15-8 and S15-10.

At step S15-14, reference intensity profile generator 35 calculates the position of each sample point q in the two-dimensional space of the frame of image data using the positions of the projected keypoints generated at step S15-12.

The transformation applied at step S15-12 defines a linear projection from the three-dimensional space of the 3D computer head model to the two-dimensional space of the frame of image data. Therefore, referring to FIGS. 16a and 16b (which show an example when the keypoints 214,216, 222 and 224 for the left eye and left eyebrow are projected into a frame of image data), when the keypoints 214,216, 222,224 are projected from the three-dimensional coordinate system of the 3D computer head model to the two-dimensional coordinate system of the frame of image data, the straight lines 202,228 defined by the keypoints remain as straight lines 202',228' in the two-dimensional space of the image data. Accordingly, the straight line 202' connecting the points 214' and 216' (which are the projections of the points 214,216) in the two-dimensional coordinate system of the image data defines the projection of the line 202, and the straight line 228' connecting the points 222' and 224' (which are the projections of the points 222,224) defines the projection of the line 228 in the two-dimensional coordinate system of the image data.

It should be noted, however, that the lengths of the lines 202' and 228' are not necessarily the same as the lengths of the lines 202,228, and that the angle between the lines 202' and 228' is not necessarily the same as the angle between the lines 202 and 228.

Figure 16A:
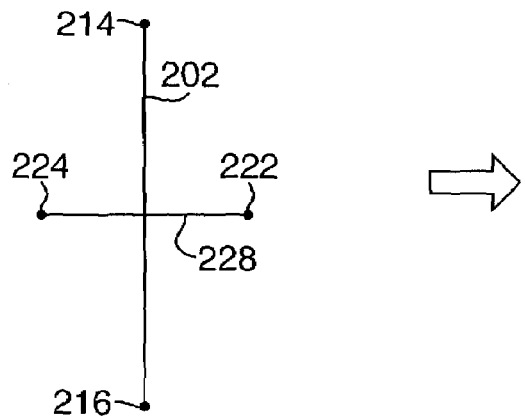
Figure 16B:
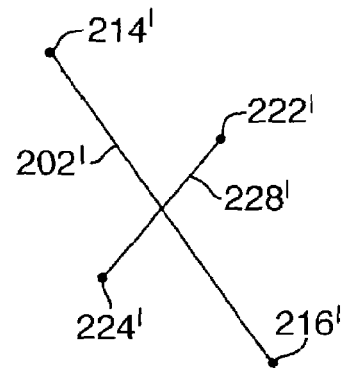
Figure 16C:
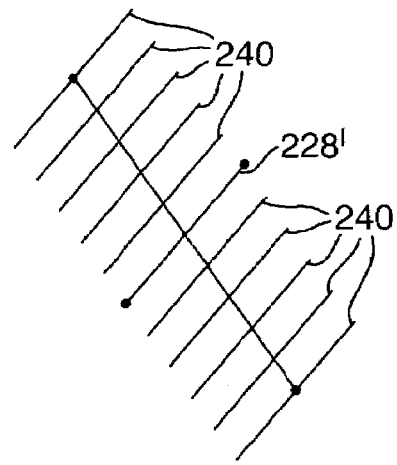
Figure 16D:
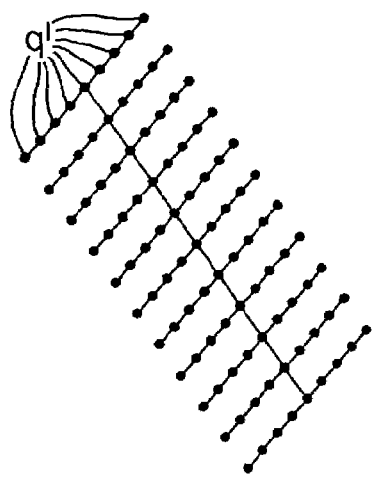

Referring to FIGS. 16c and 16d, at step S15-14, based on the data stored at step S13-4 defining the number of search bands 200, reference intensity profile generator 35 defines a plurality of straight lines 240 in the two-dimensional coordinate system of the frame of image data on each side of the line 228'. A respective line 240 is defined for each search band 200 in the left group 60 of search bands in the three-dimensional coordinate system of the 3D computer head model (other than the search band corresponding to line 228, for which line 228' is already defined). Each line 240 is defined at a position such that the lines 240 and 228' are evenly spaced along the line 202'. Each line 240 has its mid-point on the line 202', and is defined to be parallel to the line 228' with a length equal to the length of the line 228'.

Having defined the lines 228' and 240, reference intensity profile generator 35 defines sample points q' along each line. For each respective line, the sample points q' are evenly spaced along the line and the number of sample points is set to be the same as the number of sample points for each search band 200 previously defined at step S13-4.

In this way, a respective sample point q' is defined for each sample point position q shown in FIG. 14a.

Referring again to FIG. 15, at step S15-16, for each calculated sample point q', reference intensity profile generator 35 reads an image value of the image pixel within which the sample point lies. In this embodiment, reference intensity profile generator 35 reads the grey-scale intensity value of the pixel.

At step S15-18, for each search band 200, reference intensity profile generator 35 calculates and stores the average of the pixel intensity values read at step S15-16 for the sample points q' on the line 228' or 240 corresponding to the search band 200. Consequently, as a result of this processing, reference intensity profile generator 35 calculates a respective average pixel intensity value for each search band 200 in the left and right groups 60,70 of search bands.

Referring to FIG. 17, the average intensity values calculated at step S15-18 define an intensity profile 250 for the left eye and left eyebrow and an intensity profile 260 for the right eye and right eyebrow of the user. Each intensity profile 250,260 defines how the calculated average intensity value varies with position along the line 202. Consequently, each intensity profile 250,260 includes a relative reduction in intensity at positions corresponding to the pupil of an eye and positions corresponding to an eyebrow.

Referring again to FIG. 15, at step S15-20, reference intensity profile generator 35 performs processing to normalise the left and right intensity profiles generated at step S15-18 to make the respective mean value of each profile equal to zero. More particularly, in this embodiment, reference intensity profile generator 35 normalises each of the left and right intensity profiles to make it zero-mean by setting each value, $x_i$, in the profile to be:

$$x_i = \frac{x_i - \bar{x}}{x_m - \bar{x}} \quad (4)$$

where:
$\bar{x}$ is the mean value of the values in the intensity profile before normalisation;
$x_m$ is the maximum value in the intensity profile before normalisation.

The normalised profiles are stored as left and right reference intensity profiles for the user.

Referring again to FIG. 13, the processing performed by eye position calculator 40 at step S13-14 will now be described.

FIG. 18 shows the processing operations performed at step S13-14.

Referring to FIG. 18, at step S18-2, eye position calculator 40 performs processing to calculate the Y-coordinate positions of the left and right eyes within the three-dimensional coordinate system of the 3D computer head model, and at step S18-4 performs processing to calculate the X-coordinate positions of the eyes within the three-dimensional coordinate system of the 3D computer head model.

The processing performed at step S18-4 is the same as the processing performed at step S7-4 in the first embodiment. Accordingly, this processing will not be described again here, and only the processing performed at step S18-2 (which is different to that in the first embodiment) will be described.

FIG. 19 shows the processing operations performed by eye position calculator 40 for a frame of image data at step S18-2 in the second embodiment.

Referring to FIG. 19, at steps S19-2 to S19-10, eye position calculator 40 performs processing to project the eight keypoints 210–224 from their current positions in the three-dimensional space of the 3D computer head model (determined by the translation and rotation of the 3D computer head model at steps S13-10, S13-12 and S13-18) into the two-dimensional coordinate system of the image data, to define sample point positions q' in the image data, to read the intensity values of the pixels in which the sample points q' lie, to generate a respective intensity profile for the left and right eyes of the user for the current frame of image data, and to normalise the left and right intensity profiles to make each profile zero-mean.

The processing performed at steps S19-2 to S19-10 is the same as the processing performed at steps S15-12 to S15-20, described above. Accordingly, this processing will not be described again here.

At step S19-12, eye position calculator 40 compares the normalised left eye intensity profile for the current frame of image data (generated at step S19-10) with the stored reference intensity profile 250 for the user's left eye (generated at step S15-20) to calculate the Y-position in the three-dimensional space of the 3D computer model for the left eye for the current frame.

More particularly, in this embodiment, eye position calculator 40 compares the intensity profile for the current frame with the reference intensity profile 250 by performing a correlation-type operation on the two intensity profiles in accordance with the following equation:

$$c_i = \sum_{j=0}^{n-1} \frac{|R_j - F_{j+i}|}{\text{Number of valid intensity values}} \qquad (5)$$

where:

n is the number of intensity values in a profile (that is the number of search bands 200 in the left or right group 60, 70, which is 40 in this embodiment, with the intensity value number running from 0 to n−1, giving n values in total in the profile);

$C_i$ is the "i"th correlation value;

i runs from −(n−1) to +(n−1) so that 2n−1 correlation values $C_i$ are calculated;

$R_j$ is the "j"th intensity value in the reference intensity profile 250;

$F_{j+i}$ is the (j+i)th intensity value in the current frame intensity profile;

valid intensity values are values for which $0 \leq j+i \leq n-1$.

Referring to FIGS. 20a to 20e, an explanation will now be given of the correlation operation performed at step S19-12.

As explained above, a correlation value $C_i$ is calculated in accordance with equation (5) for each value of i between −(n−1) and +(n−1), so that 2n−1 correlation values are calculated.

To generate each correlation value $C_i$, one or more intensity values in the intensity profile for the current frame are subtracted from corresponding intensity values in the reference intensity profile 250, with the number and identity of the intensity values from the image frame profile and reference profile used in the subtraction being determined in accordance with the values of i and j in equation (5).

Referring to FIGS. 20a to 20e, this can be thought of as sliding the intensity profile 270 for the current frame of image data to different positions relative to the reference intensity profile 250 (each position spaced apart from the previous position by a distance equal to the distance between adjacent search bands 200) and performing the subtraction for each different relative position.

Figure 20A:
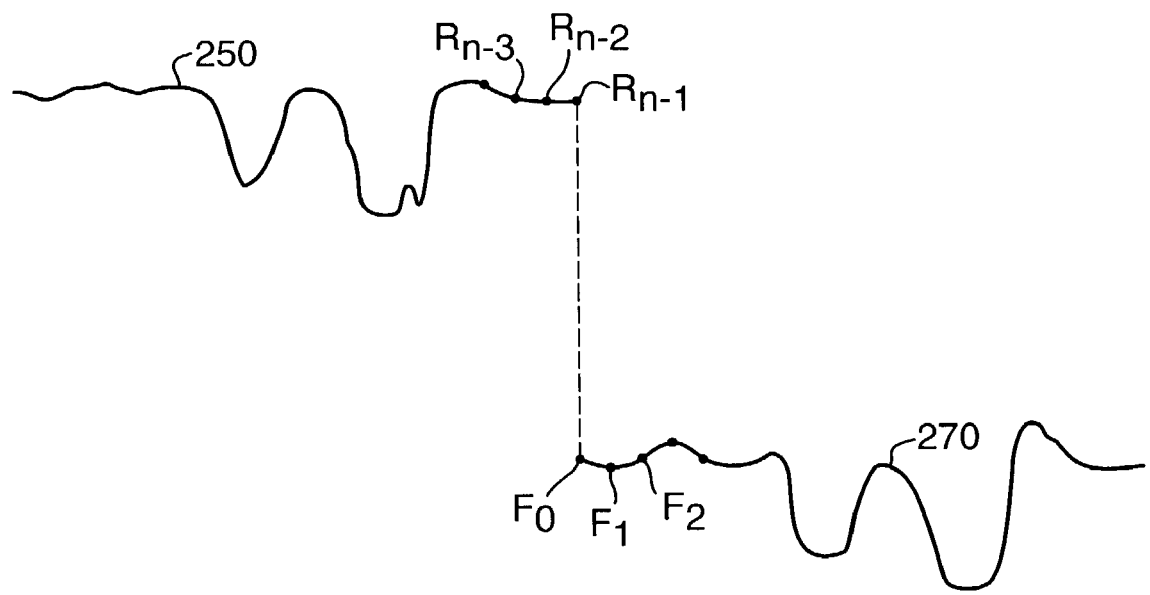

FIG. 20a illustrates the calculation of the correlation value $C_{-n+1}$. In this case, the intensity value $F_0$ from the intensity profile 270 for the current frame of image data is subtracted from the intensity value $R_{n-1}$ from the reference intensity profile 250, but no other subtractions are performed because no other points in the reference intensity profile 250 and the intensity profile 270 for the current frame of image data align.

Figure 20B:
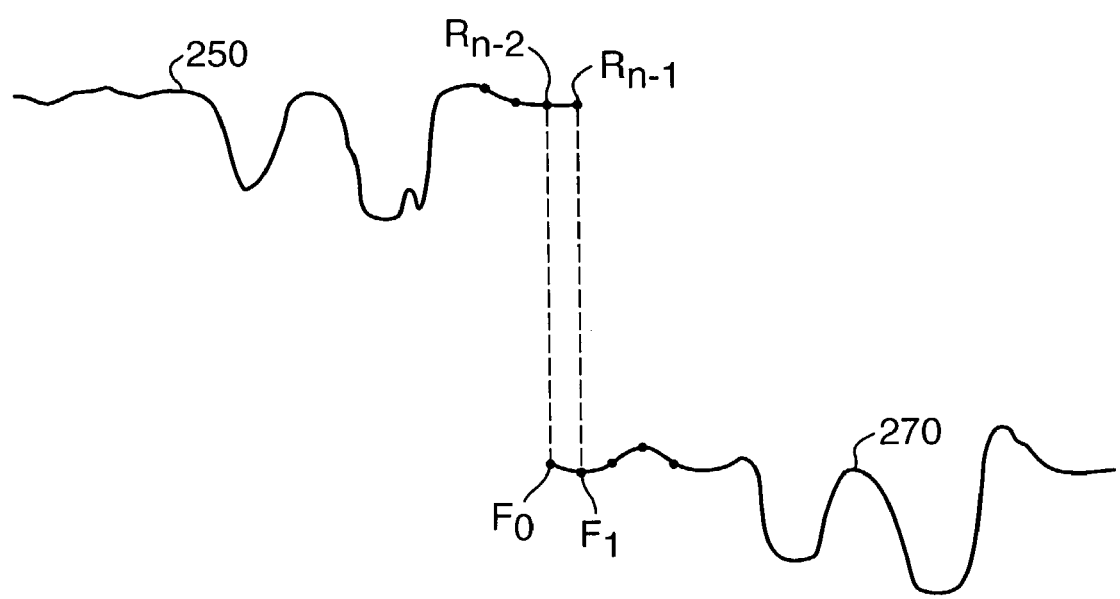

In FIG. 20b, the intensity profile 270 for the current frame of image data has been moved to the next position relative to the reference intensity profile 250 (that is, the intensity profile 270 has been moved by a distance corresponding to the distance between adjacent points in the profile—which is equal to the distance between adjacent search bands 200). The example shown in FIG. 20b, corresponds to the calculation of the correlation value $C_{-n+2}$. In this case, the intensity value $F_0$ from the intensity profile 270 for the current frame of image data is subtracted from the intensity value $R_{n-2}$ for the reference intensity profile 250, and the intensity value $F_1$ from the intensity profile 270 for the current frame image data is subtracted from the intensity value $R_{n-1}$ for the reference intensity profile 250.

The intensity profile 270 for the current frame of image data is repeatedly moved by a distance equal to the distance between adjacent points therein to different positions relative to the reference intensity frame 250 to generate each new correlation value $C_i$.

FIG. 20c shows the situation where the intensity profile 270 for the current frame of image data has been moved relative to the reference intensity profile 250 such that every point in the intensity profile 270 is aligned to correspond to a point in the reference intensity profile 250. In this case, each intensity value $F_0$ to $F_{n-1}$ in the intensity profile 270 for the current frame of image data is subtracted from the corresponding intensity value $R_0$ to $R_{n-1}$ in the reference intensity profile 250 to generate the correlation value $C_0$.

Figure 20D:
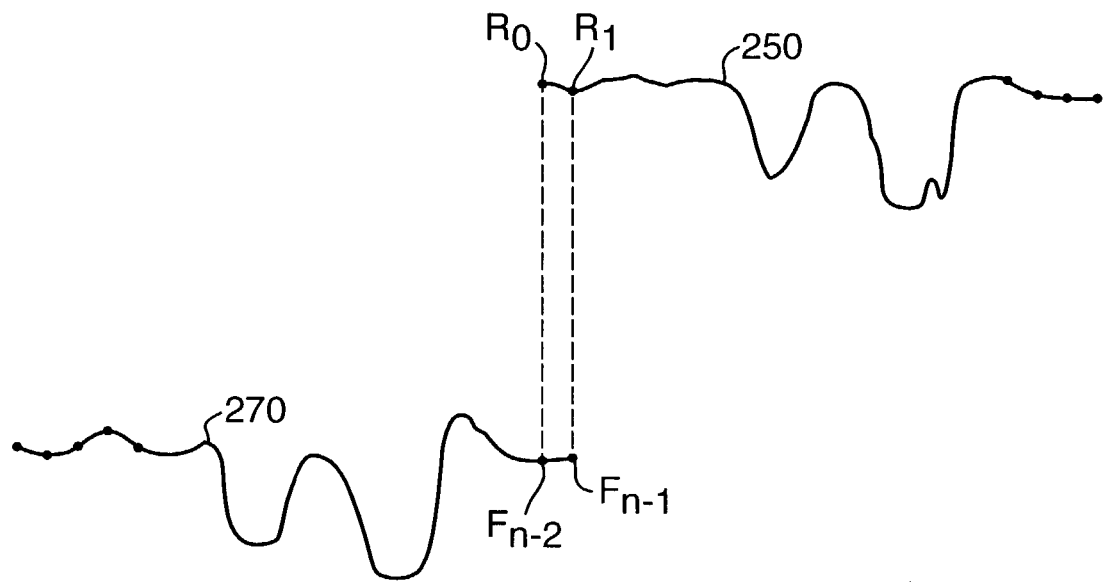
Figure 20E:
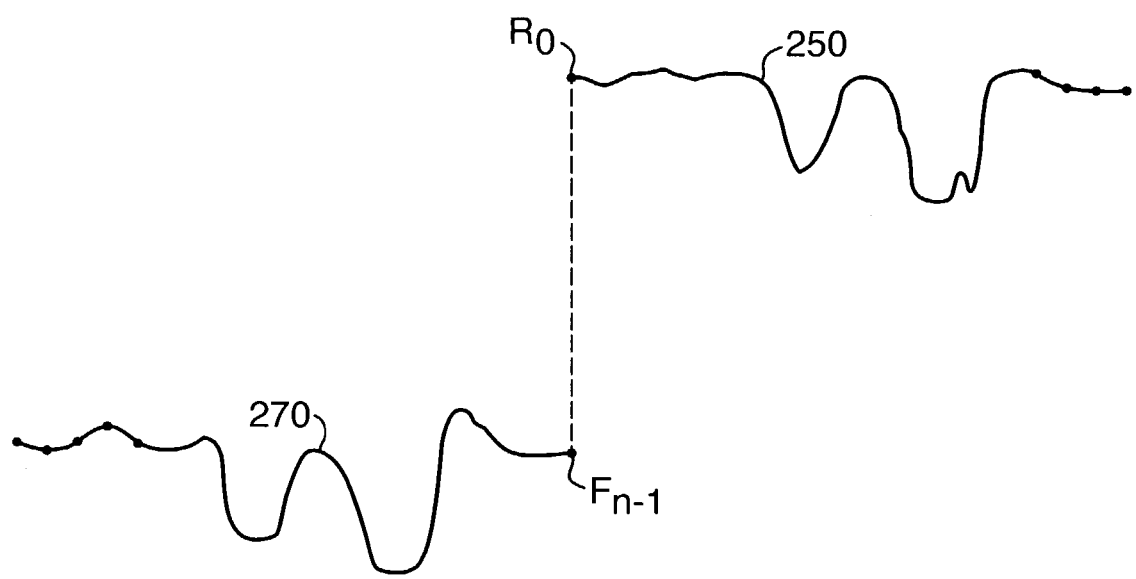

The relative positions between the intensity profiles 250 and 270 for the two final correlation values $C_{n-2}$ and $C_{n-1}$ are shown in FIGS. 20d and 20e, respectively, with the subtractions $R_0-F_{n-2}$ and $R_1-F_{n-1}$ being performed for $C_{n-2}$ and the subtraction $R_0-F_{n-1}$ being performed for $C_{n-1}$.

The correlation value $C_i$ which has the highest value of all the correlation values calculated in accordance with equation (5) defines the alignment of the intensity profile 270 for the current frame of image data relative to the reference intensity profile 250 for which the two profiles 250,270 are maximally similar.

Accordingly, eye position calculator 40 selects the highest correlation value $C_i$ generated in accordance with equation (5) and calculates the Y-coordinate of the position of the left eye of the 3D computer model in dependence upon the relative displacements of the intensity profiles 270 and 250 to which the maximum correlation value corresponds. More particularly, the relative displacement of the intensity profile 270 for the current frame of image data and the reference intensity profile 250 is defined by the value of i of the selected highest correlation value. That is, the relative displacement is zero for correlation value $C_0$, the relative displacement is equal to the distance between two adjacent search bands 200 in the positive Y-axis direction for correlation value $C_1$ (and increases in the positive Y-axis direction by a distance equal to the distance between two adjacent search bands 200 for each increase by one of the index i to the correlation value), and the relative displacement is equal to the distance between two adjacent search bands 200 in the negative Y-axis direction for correlation value $C_{-1}$ (and increases in the negative Y-axis direction by a distance equal to the distance between two adjacent search bands 200 for each decrease by one of the index i to the correlation value).

Accordingly, eye position calculator 40 calculates the Y-coordinate of the left eye by adding or subtracting from the Y-coordinate value of the current eye position an amount defined by the index i to the highest correlation value calculated in accordance with equation (5).

Referring again to FIG. 19, at step S19-14, eye position calculator 40 repeats the processing performed at step S19-12 to calculate the Y-coordinate of the right eye of the 3D computer model. This processing is the same as that performed at step S19-12 and will therefore not be described again here.

At step S19-16, eye position calculator 40 performs processing to calculate refined Y-positions for the left and right eyes respectively of the 3D computer head model.

More particularly, the Y-positions calculated at steps S19-12 and S19-14 are "quantized" positions because each position corresponds to the position of a search band 200 along one of the left or right lines 202. Accordingly, eye position calculator 40 performs processing corresponding to that performed at step S8-22 in the first embodiment (described above with reference to FIG. 9) to calculate a respective refined Y-position for each of the left and right eyes, this processing allowing each refined Y-position to lie between the positions of search bands 200 along a line 202.

By performing the processing in this way, eye position calculator 40 calculates accurate Y-coordinate values for the eyes of the 3D computer head model in three-dimensional space.

Modifications and Variations

Many modifications and variations can be made to the embodiments described above within the scope of the claims.

For example, the search regions can be defined at steps S3-4 and S13-4 to have different properties to those described above. For example, referring to FIG. 5 and FIG. 14a, the number of search bands 80,200 within the left group 60 and right group 70 does not need to be the same. In addition, the search bands 80,200 within the left group do not need to align with the search bands 80,200 in the right group.

In the first embodiment described above, the dimensions $R_x$ and $R_y$ of each search band 80 (FIG. 5) are the same as the dimensions of each search band 90 (FIG. 6). However, the search bands 90 can be defined to have different dimensions to the search bands 80. Similarly, the width $R_x$ of each search band 200 in the search embodiment may be different to the width of each search band 90.

In the first embodiment described above, the search bands 80 within each of the left and right groups 60, 70 (FIG. 5) are defined so that they are adjacent but non-overlapping in the y-axis direction. However, instead, the search band 80 within a given group 60, 70 could be defined to overlap in the y-axis direction. By defining the search bands 80 with sufficient overlap, it becomes unnecessary to perform the spatial smoothing processing at step S8-14 because such smoothing is inherently provided by the way in which the sample points "q" relate to overlapping search bands.

In the embodiments described above, refined Y-positions for the eyes are calculated at step S8-22 and step S19-16. However, in the first embodiment each search band 80 (FIG. 5) could be defined with a very small dimension $R_y$, and in the second embodiment the search. bands 200 could be defined with sub-pixel spacing between adjacent bands 200, so that it becomes unnecessary to calculate refined positions. Similarly, the dimensions $R_x$ of each search band 90 (FIG. 6) could be defined such that the processing to calculate refined positions at step S10-16 becomes unnecessary.

In the embodiments described above, the grey-scale intensity values of pixels are read at steps S8-6, S10-6, S15-16 and S19-16, and are subsequently used to determine the y-position and x-position of the eyes in 3D model space. However, different image values of the pixels may be used instead of the intensity values. For example, in a colour system, image values comprising the red, green and blue component values or hue value may be read at steps S8-6, S10-6, S15-16 and S19-6, and used to determine the y-position and x-position of the eyes and eyebrows in 3D model space. In particular, an image value comprising the green component value may be used.

In the embodiments described above, at steps S8-10, S15-18 and S19-8, the average of the pixel image values (intensity values in the embodiments) in a given band is calculated. Similarly, at step S10-10, the average of the pixel image values in a group of search bands is calculated. However, rather than calculating an average value at steps S8-10, S15-18 and S19-8 and S10-10, a different statistical measure of the pixel image values may be calculated. For example, the median, mode, geometric mean or variance may be calculated.

As part of the processing in the first embodiment at step S7-2 to calculate the eye and eyebrow y-positions in 3D model space, a test may be added, for example, between steps S8-18 and S8-20 to ensure that the least two minima in each search group 60, 70 are sufficiently spaced apart in the y-axis direction to ensure that minima have not been selected which represent features closer together than the minimum separation of the user's eye and eyebrow, thereby improving the reliability of the y-position calculations.

In the first and second embodiments above, processing may be performed, for example between steps S10-14 and S10-16, to ensure that a region of skin-coloured pixels exist in the 2D image data between the identified eyebrow positions and between the identified eye positions, thereby improving the reliability of the x-position calculations.

In the embodiments above, a spring-mass-damper technique is used at steps S3-18, S13-18 and S15-10 to rotate the 3D computer head model about axes through the centre of the head parallel to the x-axis and y-axis (that is, to update $R_x$ and $R_y$ in equation (1)). Similarly, the same technique could be used to rotate the 3D computer head model about axes through the centre of the head parallel to the z-axis (that is, to update $R_z$), for example if the processing previously performed at step S3-8, S13-8 or S15-4 did not provide head orientation information (with the result that step S3-12, S13-12 or S15-8 could not be performed).

Instead of using a spring-mass-damper technique at step S3-18, S13-18 and S15-10 to rotate the 3D computer head model, other techniques could be used. For example, the 3D computer head model could be rotated about axes through the centre of the head parallel to the x and y axes (and also about an axis through the centre of the head parallel to the z-axis if required) to minimise the average pixel intensity in the group 100–140 of the search bands 90 previously determined at step S10-14 to contain the eyes and eyebrows of the user. More particularly, the 3D computer head model may be rotated to a new orientation (new $R_x$ and/or $R_y$), and the processing of steps S10-4 to S10-10 repeated for the group of search bands previously selected at step S10-4. The calculated average intensity would then be stored and the processing repeated a number of times, each time following a new rotation of the 3D computer head model. The orientation which generates the lowest average intensity would then be selected as the correct orientation of the 3D computer head model because this most correctly aligns the 3D computer head model with the darkest regions (representing the eyes and eyebrows of the user) in the image data received from camera 4.

In the first embodiment described above, at step S3-4, sample points "q" are defined within each of the search bands 80, 90, and at steps S8-4 and S10-4, each sample point is projected from 3D model space into 2D image space to define a pixel in the 2D image whose intensity value is to be read. However, instead of defining sample points at step S3-4, the corner points of each search band 80, 90 may be projected from 3D model space into 2D image space at steps S8-4 and S10-4 to define a search region within the 2D image, and the intensity value of every pixel (or a sub-set, such as every other pixel) within the projected search band in the 2D image may be read. Similarly, the four corner points of the left group 60 of search bands 80 and the four corner points of the right group 70 of search bands 80 may be projected from 3D model space into 2D image space to define a search region within the 2D image, the search region in the 2D image space may be divided into strips corresponding to the search bands 80, and the intensity value of every pixel (or a sub-set thereof) within each strip defined in the 2D image may be read. Because the projection from 3D model space to 2D image space is a linear projection, instead of projecting the four corner points of a group 60, 70 of search bands 80 from 3D model space into 2D image space, it is only necessary to project three such points to uniquely define a projection of a search band within a 2D image.

In the second embodiment described above, instead of projecting four keypoints 210, 212, 218, 220 for the right group 70 of search bands 200 or four keypoints 214, 216, 222, 224 for the left group 60 of search bands 200 from the three-dimensional space of the 3D computer head model into 2D image space, only three points need to be projected for each group (such as three of the four keypoints for each of the left and right groups 60, 70) in order to uniquely define the projected sample point positions q'. This is because the projection from the three-dimensional space of the 3D computer head model into 2D image space is a linear projection.

In the second embodiment described above, eight keypoints 210–224 are defined at step S13-4 and are projected from the three-dimensional space of the 3D computer head model into 2D image space at steps S15-12 and S19-2. Sample point positions q' are then calculated in the 2D image at steps S15-14 and S19-4 in dependence upon the positions of the projected keypoints. However, instead, the position of each sample point q in the three-dimensional space of 3D computer head model may be defined at step S3-4 (as illustrated in FIG. 14a), and instead of performing the steps at S15-12, S15-14, S19-2 and S19-4, each sample point q may be projected from the three-dimensional space of the 3D computer head model into the 2D image space to define a sample point position q'.

In the second embodiment described above, the number of search bands 200 in each of groups 60, 70 is fixed, and similarly, the number of sample points q for each search band 200 is fixed. However, the number of search bands 200 in each group 60, 70 and/or the number of sample points q for each search band 200 may be varied during processing. For example, the number of search bands and/or number of sample points may be calculated for each frame of image data in dependence upon the size and z-axis orientation of the user's head within the image calculated at step S13-8. In this way, the number of search bands 200 and/or sample points q can be varied in dependence upon the head within the image to ensure that an unnecessarily large number of sample points q are not defined and processed, thereby saving processing resources.

In the second embodiment described above, the left and right eye reference intensity profiles 250, 260 for the user are generated at step S13-5 using one frame of image data (that is, the frame from which the positions of the user's eyes were determined at step S15-2). However, each reference intensity profile may be generated using image data from more than one frame, thereby producing left and right eye reference intensity profiles for the user which take account of lighting changes for example due to movements of the user. Thus, for example, the processing at steps S15-2 to S15-18 may be performed a number of times so that intensity profiles 250, 260 are generated at step S15-18 using different frames of image data. The generated intensity profiles for the left eye may then be averaged and normalised to give a reference profile for the left eye, and similarly the generated intensity profiles for the right eye may be averaged and normalised to give a reference profile for the right eye.

In the second embodiment described above, the correlation values $C_i$ calculated in accordance with equation (5) may be thought of as a probability density function, with the Y-coordinate of the eye being defined by the peak (maximum likelihood) of the function. Accordingly, other processing operations conventionally applied when using probability density functions may be used. For example, the probability density function defined by the correlation values $C_i$ may be multiplied by a Gaussian function representing the expected position of the eye (determined, for example, in dependence upon how far the user's eye may move given the likely speed of movement of a user's head and the time between the recording of consecutive frames of image data). Other operations, could, of course, be performed instead or as well.

In the second embodiment described above, the search bands 200 are defined in the three-dimensional space of the 3D computer head model such that, when the search bands are transformed into a two-dimensional image, the spacing between adjacent transformed search bands is equal to one pixel in the image. However, instead, the search bands 200 may be defined in the three-dimensional space with different spacings therebetween. For example, the search bands 200 may be define in three-dimensional space of the 3D computer head model such that, when the search bands are transformed into a 2D image, the spacing between adjacent transformed search bands is less than one pixel in the image.

In the second embodiment above, each search band 200 is a line. However, instead, the search bands 80 from the first embodiment may be used in the second embodiment instead of the lines 200, and the processing from the first embodiment to calculate a respective average pixel intensity value for each search band 80 may be used in the second embodiment. In this way, left and right eye reference intensity profiles 250, 260 would be generated using the search bands and associated processing from the first embodiment, but the number of values within each reference profile would be fewer in number than if the reference profiles were generated using lines 200 (because each search band 80 has a width $R_y$ greater than the width of each line 200).

In the embodiments described above, the 3D computer model stored in head model store 24 is a 3D computer model of the head of the user 2, generated, for example, by laser scanning etc. However, instead, the three-dimensional computer model does not actually need to be a model of the head of the user 2, but instead may be a 3D computer model of a representative head.

In the embodiments described above, the three-dimensional computer model defined by the data stored in head model store 24 comprises a 3D computer model of a complete head. However, instead, the 3D computer model may comprise a model of just the relevant parts of the head, that is the parts containing the eyes and eyebrows.

In the embodiments described above, the processing to calculate the eye y-positions in 3D model space (step S7-2 and step S18-2) is performed before the processing to calculate the eye x-positions in 3D model space (step S7-4 and step S18-4). However, instead, the processing to calculate the eye x-positions in 3D model space may be performed before the processing to calculate the eye y-positions in 3D model space.

In the embodiments described above, the search bands 80, 200 for determining the eye and eyebrow y-coordinates are arranged (FIG. 5 and FIG. 14*a*) in groups 60, 70 to divide the three-dimensional model space into bands extending from above the left eyebrow to below the left eye and bands extending from above the right eyebrow to below the right eye. On the other hand, the search bands 90 for determining eye and eyebrow x-coordinates are arranged (FIG. 6) in groups of four bands, and the x-coordinates are calculated in dependence upon the group having the smallest minima in the average pixel intensity values (step S10-14). However, instead, the search bands 90 for determining the eye and eyebrow x-coordinates may be treated as separate, independent search bands 90 arranged in two groups—the first group aligned on the y-coordinate line $Y_B$ corresponding to the eyebrows in the 3D computer model and the second group aligned on the y-coordinate line $Y_E$ corresponding to the eyes in the 3D computer model. The x-coordinates of the eyes and eyebrows may then be calculated by identifying the search bands 90 corresponding to the least two minima within each of the first and second groups. The least two minima in the first group identify the search bands corresponding to the left and right eyebrows, while the least two minima in the second group identify the search bands corresponding to the left and right eyes. Similarly, in the first embodiment, the search bands 80 for determining the eye and eyebrow y-coordinates may be arranged in groups of four bands having relative positions set in dependence upon the spacing between the eyes and eyebrows in the 3D computer model (in the same way that the relative spacing of the bands 90 in the embodiment described above is set) and the eye and eyebrow y-coordinates may be calculated by identifying the group of search bands having the smallest minima in the average pixel intensity values (in the same way that this was performed for the x-coordinate calculation in the embodiment described above).

In the embodiments described above, data is input by a user defining intrinsic parameters of the camera 4. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the embodiments described above, processing is performed by a computer using processing routines defined by programming instructions. However, some, or all, of the processing could, of course, be performed using hardware.

Other modifications are, of course, possible.

The invention claimed is:

1. A method of processing data in a processing apparatus to perform eye tracking across a sequence of images of a moving head, the method comprising processing each of at least some of the images in the sequence by:
   identifying pixels in the image corresponding to search regions defined relative to a three-dimensional computer model representative of at least part of a head in a three-dimensional space, the search regions being defined with different positions in a portion of the three-dimensional space corresponding to the eyes and eyebrows of the model, and the identification of pixels being performed in dependence upon data defining a transformation between the three-dimensional space and the two-dimensional image;
   determining image values of the identified pixels;
   generating at least one respective representative image value for each search region using the determined image values; and
   determining eye positions in the three-dimensional space in dependence upon the relationship between the generated representative image values for different search regions.

2. A method according to claim 1, further comprising:
   rotating the three-dimensional computer head model in dependence upon the determined positions for the eyes, so as to move the search regions within the three-dimensional space for subsequent processing of the next image in the sequence to be processed.

3. A method according to claim 1, wherein the identification of pixels is carried out by projecting sample points defined in the three-dimensional space within the search regions into the image, and identifying the pixels onto which the sample points project.

4. A method according to claim 1, wherein the identification of pixels is carried out by projecting points from the three-dimensional space into the image to generate projected points, defining projected search regions in the image in dependence upon the projected points, and identifying pixels in the projected search regions.

5. A method according to claim 1, wherein each search region is a two-dimensional area of the three-dimensional space.

6. A method according to claim 1, wherein each search region is a line in the three-dimensional space.

7. A method of processing data in a processing apparatus defining a sequence of images of a person as the person's head moves, to track the eyes of the person in the images, the method comprising processing each of at least some of the images in the sequence by:
  determining image values of pixels located in the image at positions defined by the projection of search bands or points therein from a three-dimensional space into the two-dimensional image, wherein the search bands have different positions in the three-dimensional space, and wherein the projection is dependent upon the position and orientation of the search bands in the three-dimensional space resulting from the processing of the previous image in the sequence to be processed;
  generating at least one respective representative image value for each search band using the determined image values;
  determining eye positions in the three-dimensional space in dependence upon the relationship between the generated representative image values for different search bands; and
  moving the search bands within the three-dimensional space in dependence upon the calculated positions for the eyes, so as to move the search bands for subsequent processing of the next image in the sequence to be processed.

8. A method of processing data in a processing apparatus to perform eye tracking across a sequence of images of a moving head, the method comprising processing each of at least some of the images in the sequence by:
  identifying pixels in the image corresponding to search regions defined relative to a three-dimensional computer model representative of at least part of a head in a three-dimensional space, the search regions being defined with different positions in a portion of the three-dimensional space corresponding to the eyes and eyebrows of the model, and the identification of pixels being performed in dependence upon data defining a transformation between the three-dimensional space and the two-dimensional image;
  determining image values of the identified pixels;
  generating at least one respective representative image value for each search region using the determined image values;
  generating an image value profile from the generated representative image values representative of the variation in the representative image values with variation in search region position; and
  comparing the generated image value profile with a reference profile to determine eye positions in the three-dimensional space.

9. A method according to claim 8, further comprising:
  rotating the three-dimensional computer head model in dependence upon the determined positions for the eyes, so as to move the search regions within the three-dimensional space for subsequent processing of the next image in the sequence to be processed.

10. A method according to claim 8, wherein the identification of pixels is carried out by projecting sample points defined in the three-dimensional space within the search regions into the image, and identifying the pixels onto which the sample points project.

11. A method according to claim 8, wherein the identification of pixels is carried out by projecting points from the three-dimensional space into the image to generate projected points, defining projected search regions in the image in dependence upon the projected points, and identifying pixels in the projected search regions.

12. A method according to claim 8, wherein each search region comprises a line in the three-dimensional space of the computer model.

13. A method according to claim 12, wherein the spacing between adjacent search regions in the three-dimensional space is such that, when the search regions are transformed into a two-dimensional image in accordance with the transformation data, the spacing between adjacent transformed search regions is less than or equal to one pixel in the image.

14. A method according to claim 8, wherein the search regions extend in a transverse direction to a line through an eye and an eyebrow of the three-dimensional computer model.

15. A method according to claim 14, wherein the search regions extend in a perpendicular direction to the line through the eye and the eyebrow.

16. A method according to claim 14, wherein the search regions intersect the line through the eye and the eyebrow at different respective positions therealong.

17. A method according to claim 8, wherein a respective average value of the plurality of image values is calculated as the representative value for each search region.

18. A method according to claim 8, wherein the processing to compare the generated image value profile with the reference profile comprises processing to compare the generated profile and reference profile for different relative positions thereof.

19. A method according to claim 18, wherein the processing to compare the generated image value profile with the reference profile comprises processing to compare the generated profile and reference profile for different relative positions thereof to determine the match therebetween for each relative position and to determine the relative position for which the match between the generated profile and reference profile is greatest.

20. A method of processing data in a processing apparatus defining a sequence of images of a person as the person's head moves, to track the eyes of the person in the images, the method comprising processing each of at least some of the images in the sequence by:
  determining image values of pixels located in the image at positions defined by the projection of search bands or positions therein from a three-dimensional space into the two-dimensional image, wherein the search bands have different positions in the three-dimensional space, and wherein the projection is dependent upon the position and orientation of the search bands in the three-dimensional space resulting from the processing of the previous image in the sequence to be processed;
  generating at least one representative image value for each search band using the determined pixel image values;
  comparing the generated representative image values for different search bands with reference image values representative of image values for an eye and an eyebrow to calculate positions for the eyes in the three-dimensional space; and moving the search bands within the three-dimensional space in dependence upon the calculated positions for the eyes, so as to move the search bands for subsequent processing of the next image in the sequence to be processed.

21. A method of processing data in a processing apparatus to perform eye tracking across a sequence of images of a moving head, the method comprising processing each of at least some of the images in the sequence by:

identifying pixels in the image in dependence upon search regions defined relative to a three-dimensional computer model representative of at least part of a head in a three-dimensional space, the search regions dividing into parts a portion of the three-dimensional space corresponding to the eyes and eyebrows of the model, and in dependence upon data defining a transformation between the three-dimensional space and the two-dimensional image;

determining image values of the identified pixels;

generating at least one respective representative image value for each search region using the determined image values;

determining which of the search regions project onto dark regions in the image by comparing the generated representative image values of different search regions; and determining eye positions in the three-dimensional space in dependence upon the position of at least one search region determined to project onto a dark region in the image.

22. A method according to claim 21, further comprising:

rotating the three-dimensional computer head model in dependence upon the determined positions for the eyes, so as to move the search regions within the three-dimensional space for subsequent processing of the next image in the sequence to be processed.

23. A method according to claim 21, wherein the identification of pixels is carried out by projecting sample points defined in the three-dimensional space within the search regions into the image, and identifying the pixels onto which the sample points project.

24. A method according to claim 21, wherein:

the search regions include first and second groups of search regions, the first group dividing into parts a portion of the three-dimensional space extending over a first two of the left eyebrow, left eye, right eyebrow and right eye of the three-dimensional computer model, and the second group dividing into parts a portion of the three-dimensional space extending over a second two of the left eyebrow, left eye, right eyebrow and right eye of the three-dimensional computer model;

first and second search regions which correspond to dark regions in the image are identified within each group; and positions for the eyes are determined in dependence upon the relative positions of the identified search regions within each group.

25. A method according to claim 24, wherein:

the search regions include first and second groups of search regions, the first group dividing into parts a portion of the three-dimensional space extending from above the left eyebrow to below the left eye of the three-dimensional computer model, and the second group dividing into parts a portion of the three-dimensional space extending from above the right eyebrow to below the right eye of the three-dimensional computer model;

first and second search regions corresponding to dark regions in the image are identified within each group; and positions for the eyes are determined in dependence upon the position of the identified search region within each group which corresponds to a lower position on the three-dimensional computer head model.

26. A method according to claim 24, wherein:

the search regions include first and second sets of search regions;

the first set of search regions contains first and second groups of search regions, the first group dividing into parts a portion of the three-dimensional space extending over a first two of the left eyebrow, left eye, right eyebrow and right eye of the three-dimensional computer model and the second group dividing into parts a portion of the three-dimensional space extending over a second two of the left eyebrow, left eye, right eyebrow and right eye of the three-dimensional computer model;

within the second set of search regions, each search region comprises a plurality of spatially separated parts having relative positions dependent upon the spacing of the eyes and eyebrows in the three-dimensional computer model;

values of a first coordinate of the eye positions are determined by:

identifying first and second search regions within each group of the first set corresponding to dark regions in the image; and determining values of the first coordinate for the eye positions in dependence upon the relative positions of the identified search regions within each group in the first set; and values for a second coordinate of the eye positions are determined by:

identifying a search region in the second set corresponding to dark regions in the image; and determining values of the second coordinate for the eye positions in dependence upon the positions of the spatially separated parts within the identified search region of the second set.

27. A method according to claim 26, wherein:

the plurality of search regions in the second set divide into parts a portion of the three-dimensional space extending from outside the left eye to outside the right eye of the three-dimensional computer model; and the processing to determine the values of the second coordinate includes:

selecting from among the search regions in the second set the search region which corresponds to the darkest region in the image; and determining values of the second coordinate for the eye positions in dependence upon the positions of the spatially separated areas within the identified search region of the second set.

28. A method according to claim 21, wherein the search regions are defined with overlaps in the three-dimensional space.

29. A method according to claim 21, wherein each search region is a two-dimensional area of the three-dimensional space.

30. A method according to claim 21, wherein the processing to determine which search regions project onto dark regions in the image includes:
spatially smoothing the representative image values; and
identifying search regions which project onto dark regions in the image using the smoothed representative image values.

31. A method according to claim 21, wherein an average value of the pixel image values is calculated as the representative value for each search region.

32. A method of processing data in a processing apparatus defining a sequence of images of a person as the person's head moves, to track the eyes of the person in the images, the method comprising processing each of least some of the images in the sequence by:
determining the image values of pixels located in the image at positions defined by the projection of search bands or points therein from a three-dimensional space into the two-dimensional image, wherein the search bands have different positions in the three-dimensional space so as to divide into parts a portion of the three-dimensional space, and wherein the projection is dependent upon the position and orientation of the search bands in the three-dimensional space resulting from the processing of the previous image in the sequence to be processed;
calculating a respective representative image value for each search band using the determined pixel image values;
calculating positions for the eyes in the three-dimensional space by comparing the representative image values for different search bands to identify at least one search band corresponding to a dark region in the image; and
moving the search bands within the three-dimensional space in dependence upon the calculated positions for the eyes, so as to move the search bands for subsequent processing of the next image in the sequence to be processed.

33. A method according to any one of claims 1, 7, 8, 20, 21 and 32, wherein the processing of each image further comprises:
processing the image data to determine a position of the head in the image; and
moving the three-dimensional computer model of the head and the associated search regions within the three-dimensional space in dependence upon the determined position.

34. A method according to any one of claims 1, 7, 8, 20, 21 and 32, wherein the processing of each image further comprises:
processing the image data to determine a size of the head in the image; and
moving the three-dimensional computer model of the head and the associated search regions within the three-dimensional space in dependence upon the determined size.

35. A method according to any one of claims 1, 7, 8, 20, 21 and 32, further comprising defining the search regions in the three-dimensional space.

36. A method according to any one of claims 1, 7, 8, 20, 21 and 32, further comprising calculating a gaze direction for each of at least some of the images.

37. A method according to claim 36, further comprising transmitting a signal conveying the determined gaze direction.

38. A method according to claim 37, further comprising making a recording of the signal either directly or indirectly.

39. Image processing apparatus for processing image data of at least some images in a sequence of images of a moving head to perform eye tracking across the sequence, the apparatus comprising:
a data store configured to store data defining a three-dimensional computer model representative of at least part of a head in a three-dimensional space, and data defining search regions having different positions in a portion of the three-dimensional space corresponding to the eyes and eyebrows of the model;
a pixel identifier operable to identify pixels in an image corresponding to the search regions, the pixel identifier being operable to identify pixels in dependence upon a transformation between the three-dimensional space and the two-dimensional image;
an image value determinator operable to determine image values of the identified pixels;
a representative value calculator operable to generate at least one respective representative image value for each search region using the determined image values; and
an eye position determinator operable to determine eye positions in the three-dimensional space in dependence upon the relationship between the generated representative image values for different search regions.

40. An apparatus according to claim 39, further comprising:
a computer model rotator operable to rotate the three-dimensional computer head model in dependence upon the determined positions for the eyes, so as to move the search regions within the three-dimensional space for subsequent processing of the next image in the sequence to be processed.

41. Apparatus for processing image data of each of at least some images in a sequence of images of a person as the person's head moves, to track the eyes of the person in the images, the apparatus comprising:
a pixel identifier operable to identify pixels located in the image at positions defined by the projection of search bands or points therein from a three-dimensional space into the two-dimensional image, wherein the search bands have different positions in the three-dimensional space, and wherein the projection is dependent upon the position and orientation of the search bands in the three-dimensional space resulting from the processing of the previous image in the sequence to be processed;
an image value determinator operable to determine image values of the identified pixels;
a representative value calculator operable to generate at least one respective representative image value for each search band using the determined image values;
an eye position calculator operable to calculate positions for the eyes in the three-dimensional space in dependence upon the relationship between the generated representative image values for different search bands; and
a search band mover operable to move the search bands within the three-dimensional space in dependence upon the calculated positions for the eyes, so as to move the search bands for subsequent processing of the next image in the sequence to be processed.

42. Apparatus for processing image data of each of at least some images in a sequence of images of a moving head to perform eye tracking across the sequence, the apparatus comprising:
a data store configured to store data defining a three-dimensional computer model representative of at least part of a head in a three-dimensional space, and data defining search regions having different positions in a portion of the three-dimensional space corresponding to the eyes and eyebrows of the model;

a pixel identifier operable to identify pixels in the image corresponding to the search regions, the pixel identifier being operable to identify pixels in dependence upon a transformation between the three-dimensional space and the two-dimensional image;

an image value determinator operable to determine image values of the identified pixels;

a representative value calculator operable to generate at least one respective representative image value for each search region using the determined image values;

a profile generator operable to generate an image value profile from the generated representative image values representative of the variation in the representative image values with variation in search region position; and a profile comparer operable to compare the generated image value profile with a reference profile to determine eye positions in the three-dimensional space.

43. Apparatus according to claim 42, further comprising:

a computer model rotator operable to rotate the three-dimensional computer head model in dependence upon the determined positions for the eyes, so as to move the search regions within the three-dimensional space for subsequent processing of the next image in the sequence to be processed.

44. Apparatus for processing image data of each of at least some images in a sequence of images of a person as the person's head moves, to track the eyes of the person in the images, the apparatus comprising:

a pixel identifier operable to identify pixels located in the image at positions defined by the projection of search bands or positions therein from a three-dimensional space into the two-dimensional image, wherein the search bands have different positions in the three-dimensional space, and wherein the projection is dependent upon the position and orientation of the search bands in the three-dimensional space resulting from the processing of the previous image in the sequence to be processed;

an image value determinator operable to determine image values of the identified pixels;

a value generator operable to generate at least one representative image value for each search band using the determined pixel image values;

a comparer operable to compare the generated representative image values for different search bands with reference image values representative of image values for an eye and an eyebrow to calculate positions for the eyes in the three-dimensional space; and a search band mover operable to move the search bands within the three-dimensional space in dependence upon the calculated positions for the eyes, so as to move the search bands for subsequent processing of the next image in the sequence to be processed.

45. Apparatus for processing image data of at least some images in a sequence of images of a moving head to perform eye tracking across the sequence, the apparatus comprising:

a data store configured to store data defining a three-dimensional computer model representative of at least part of a head in a three-dimensional space, and data defining search regions dividing into parts a portion of the three-dimensional space corresponding to the eyes and eyebrows of the model;

a pixel identifier operable to identify pixels in the image in dependence upon the search regions and in dependence upon data defining a transformation between the three-dimensional space and the two-dimensional image;

an image value determinator operable to determine image values of the identified pixels;

a representative value calculator operable to generate at least one respective representative image value for each search region using the determined image values;

a search region selector operable to determine which of the search regions project onto dark regions in the image by comparing the generated representative image values of different search regions; and an eye position determinator operable to determine eye positions in the three-dimensional space in dependence upon the position of at least one search region determined to project onto a dark region in the image.

46. An apparatus according to claim 45, further comprising:

a computer model rotator operable to rotate the three-dimensional computer head model in dependence upon the determined positions for the eyes, so as to move the search regions within the three-dimensional space for subsequent processing of the next image in the sequence to be processed.

47. Apparatus for processing image data of each of at least some images in a sequence of images of a person as the person's head moves, to track the eyes of the person in the images, the apparatus comprising:

a pixel identifier operable to identify pixels located in the image at positions defined by the projection of search bands or points therein from a three-dimensional space into the two-dimensional image, wherein the search bands have different positions in the three-dimensional space so as to divide into parts a portion of the three-dimensional space, and wherein the projection is dependent upon the position and orientation of the search bands in the three-dimensional space resulting from the processing of the previous image in the sequence to be processed;

an image value determinator operable to determine image values of the identified pixels;

a value calculator operable to calculate a respective representative image value for each search band using the determined pixel image values;

an eye position calculator operable to calculate positions for the eyes in the three-dimensional space by comparing the representative image values for different search bands to identify at least one search band corresponding to a dark region in the image; and a search band mover operable to move the search bands within the three-dimensional space in dependence upon the calculated positions for the eyes, so as to move the search bands for subsequent processing of the next image in the sequence to be processed.

48. A storage medium storing computer program instructions for programming a programmable processing apparatus to become operable to perform a method as set out in at any one of claims 1, 7, 8, 20, 21 and 32.

49. A signal carrying computer program instructions for programming a programmable processing apparatus to become operable to perform a method as set out in any one of claims 1, 7, 8, 20, 21 and 32.

50. Image processing apparatus for processing image data of at least some images in a sequence of images of a moving head to perform eye tracking across the sequence, the apparatus comprising:

means for storing data defining a three-dimensional computer model representative of at least part of a head in a three-dimensional space, and data defining search regions having different positions in a portion of the three-dimensional space corresponding to the eyes and eyebrows of the model;

pixel identifying means for identifying pixels in an image corresponding to the search regions, the pixel identifying means being operable to identify pixels in dependence upon a transformation between the three-dimensional space and the two-dimensional image;

means for determining image values of the identified pixels;

representative value calculating means for generating at least one respective representative image value for each search region using the determined image values; and means for determining eye positions in the three-dimensional space in dependence upon the relationship between the generated representative image values for different search regions.

51. Apparatus for processing image data of each of at least some images in a sequence of images of a person as the person's head moves, to track the eyes of the person in the images, the apparatus comprising:

means for identifying pixels located in the image at positions defined by the projection of search bands or points therein from a three-dimensional space into the two-dimensional image, wherein the search bands have different positions in the three-dimensional space, and wherein the projection is dependent upon the position and orientation of the search bands in the three-dimensional space resulting from the processing of the previous image in the sequence to be processed;

means for determining image values of the identified pixels;

representative value calculating means for generating at least one respective representative image value for each search band using the determined image values;

means for calculating positions for the eyes in the three-dimensional space in dependence upon the relationship between the generated representative image values for different search bands; and means for moving the search bands within the three-dimensional space in dependence upon the calculated positions for the eyes, so as to move the search bands for subsequent processing of the next image in the sequence to be processed.

52. Apparatus for processing image data of each of at least some images in a sequence of images of a moving head to perform eye tracking across the sequence, the apparatus comprising:

means for storing data defining a three-dimensional computer model representative of at least part of a head in a three-dimensional space, and data defining search regions having different positions in a portion of the three-dimensional space corresponding to the eyes and eyebrows of the model;

pixel identifying means for identifying pixels in the image corresponding to the search regions, the pixel identifying means being operable to identify pixels in dependence upon a transformation between the three-dimensional space and the two-dimensional image;

means for determining image values of the identified pixels;

representative value calculating means for generating at least one respective representative image value for each search region using the determined image values;

means for generating an image value profile from the generated representative image values representative of the variation in the representative image values with variation in search region position; and means for comparing the generated image value profile with a reference profile to determine eye positions in the three-dimensional space.

53. Apparatus for processing image data of each of at least some images in a sequence of images of a person as the person's head moves, to track the eyes of the person in the images, the apparatus comprising:

means for identifying pixels located in the image at positions defined by the projection of search bands or positions therein from a three-dimensional space into the two-dimensional image, wherein the search bands have different positions in the three-dimensional space, and wherein the projection is dependent upon the position and orientation of the search bands in the three-dimensional space resulting from the processing of the previous image in the sequence to be processed;

means for determining image values of the identified pixels;

means for generating at least one representative image value for each search band using the determined pixel image values;

means for comparing the generated representative image values for different search bands with reference image values representative of image values for an eye and an eyebrow to calculate positions for the eyes in the three-dimensional space; and means for moving the search bands within the three-dimensional space in dependence upon the calculated positions for the eyes, so as to move the search bands for subsequent processing of the next image in the sequence to be processed.

54. Apparatus for processing image data of at least some images in a sequence of images of a moving head to perform eye tracking across the sequence, the apparatus comprising:

means for storing data defining a three-dimensional computer model representative of at least part of a head in a three-dimensional space, and data defining search regions dividing into parts a portion of the three-dimensional space corresponding to the eyes and eyebrows of the model;

pixel identifying means for identifying pixels in the image in dependence upon the search regions and in dependence upon data defining a transformation between the three-dimensional space and the two-dimensional image;

means for determining image values of the identified pixels;

representative value calculating means for generating at least one respective representative image value for each search region using the determined image values;

search region selection means for determining which of the search regions project onto dark regions in the image by comparing the generated representative image values of different search regions; and eye position determining means for determining eye positions in the three-dimensional space in dependence upon the positions of at least one search region determined to project onto a dark region in the image.

55. Apparatus for processing image data of each of at least some images in a sequence of images of a person as the person's head moves, to track the eyes of the person in the images, the apparatus comprising:

means for identifying pixels located in the image at positions defined by the projection of search bands or points therein from a three-dimensional space into the two-dimensional image, wherein the search bands have different positions in the three-dimensional space so as to divide into parts a portion of the three-dimensional space, and wherein the projection is dependent upon the position and orientation of the search bands in the three-dimensional space resulting from the processing of the previous image in the sequence to be processed;

means for determining image values of the identified pixels;

means for calculating a respective representative image value for each search band using the determined pixel image values;

means for calculating positions for the eyes in the three-dimensional space by comparing the representative image values for different search bands to identify at least one search band corresponding to a dark region in the image; and means for moving the search bands within the three-dimensional space in dependence upon the calculated positions for the eyes, so as to move the search bands for subsequent processing of the next image in the sequence to be processed.

56. A method according to claim 21, wherein:

each search region comprises a plurality of spatially separated parts having relative positions dependent upon the spacing of the eyes and eyebrows in the three-dimensional computer model; and eye positions are determined in the three-dimensional space by:

identifying a search region having parts corresponding to dark regions in the image; and determining eye coordinate values in dependence upon the identified parts.

57. A method according to claim 21, wherein the generated representative image values are compared to determine which of the search regions corresponds to the darkest region of the image relative to the other search regions, and the eye positions are determined in dependence upon the determined search region.

58. A method according to any one of claims 7, 20 and 32, wherein each search band has a rectangular shape.

59. Apparatus according to claim 45, wherein:

each search region comprises a plurality of spatially separated parts having relative positions dependent upon the spacing of the eyes and eyebrows in the three-dimensional computer model;

the search region selection means is operable to identify a search region having parts corresponding to dark regions in the image; and the eye position determining means is operable to determine eye coordinate values in dependence upon the identified parts.

60. Apparatus according to claim 45, wherein the search region selection means is operable to compare the generated representative image values to determine which of the search regions corresponds to the darkest region of the image relative to the other search regions, and the eye position calculating means is operable to determine the eye positions in dependence upon the determined search region.

61. Apparatus according to any one of claims 41, 44 and 47, wherein each search band has a rectangular shape.

* * * * *